United States Patent [19]
Takemura et al.

[11] Patent Number: 5,859,593
[45] Date of Patent: Jan. 12, 1999

[54] METHOD AND APPARATUS FOR CONTROLLING POSITIONS OF MEMBERS PROVIDED ON A CAR

[75] Inventors: Shinji Takemura; Masaki Mori; Tsuneo Hida, all of Aichi, Japan

[73] Assignee: Aisin Seiki Kabushiki Kaisha, Aichi, Japan

[21] Appl. No.: 895,893

[22] Filed: Jul. 17, 1997

Related U.S. Application Data

[63] Continuation of Ser. No. 830,455, Feb. 5, 1992, abandoned, which is a continuation of Ser. No. 501,579, Mar. 30, 1990, abandoned.

[30] Foreign Application Priority Data

Mar. 31, 1989 [JP] Japan ................................. 1-083367

[51] Int. Cl.$^6$ .................................................... H04Q 1/00
[52] U.S. Cl. .............................. 340/825.06; 340/825.31; 340/505; 340/526; 701/36; 701/49
[58] Field of Search .................. 340/825.06, 825.54, 340/502, 504, 505, 313, 825.44, 825.31, 526; 364/424.01, 424.03, 424.05; 371/11.2; 701/36, 49

[56] References Cited

U.S. PATENT DOCUMENTS

| | | | |
|---|---|---|---|
| 4,204,255 | 5/1980 | Cremer | 364/424.05 |
| 4,399,502 | 8/1983 | MacDonald et al. | 340/825.06 |
| 4,538,264 | 8/1985 | Bahr | 371/11.2 |
| 4,660,140 | 4/1987 | Illg | 364/424.05 |
| 4,754,255 | 6/1988 | Sanders | 340/825.31 |
| 4,893,240 | 1/1990 | Karkouti | 364/424.05 |
| 4,928,096 | 5/1990 | Leonardo et al. | 340/825.44 |
| 4,940,963 | 7/1990 | Gutman et al. | 340/825.44 |

FOREIGN PATENT DOCUMENTS

| | | |
|---|---|---|
| 58-75217 | 5/1983 | Japan . |
| 61-67659 | 4/1986 | Japan . |

*Primary Examiner*—Brian Zimmerman
*Attorney, Agent, or Firm*—Sughrue, Mion, Zinn, Macpeak & Seas, PLLC

[57] ABSTRACT

The positions of position-controlled members provided on a car, for example, the driver's seat, steering wheel and mirrors, are controlled by a host position control unit through a plurality of position control units which are controlled on the basis of control signals transmitted from the host position control unit. After receiving the signal transmitted from the host position control unit, each position control unit sends a 1-pulse answer signal to the host position control unit through a returning unit. When the returning unit sends no answer signal in response to a control signal transmitted from the host position control unit, an abnormality recognizing device recognizes the fact that there is an abnormality in the communication system. Accordingly, any abnormality occurring in the communication system is promptly detected and it is therefore possible to quickly cope with the abnormal situation.

8 Claims, 30 Drawing Sheets

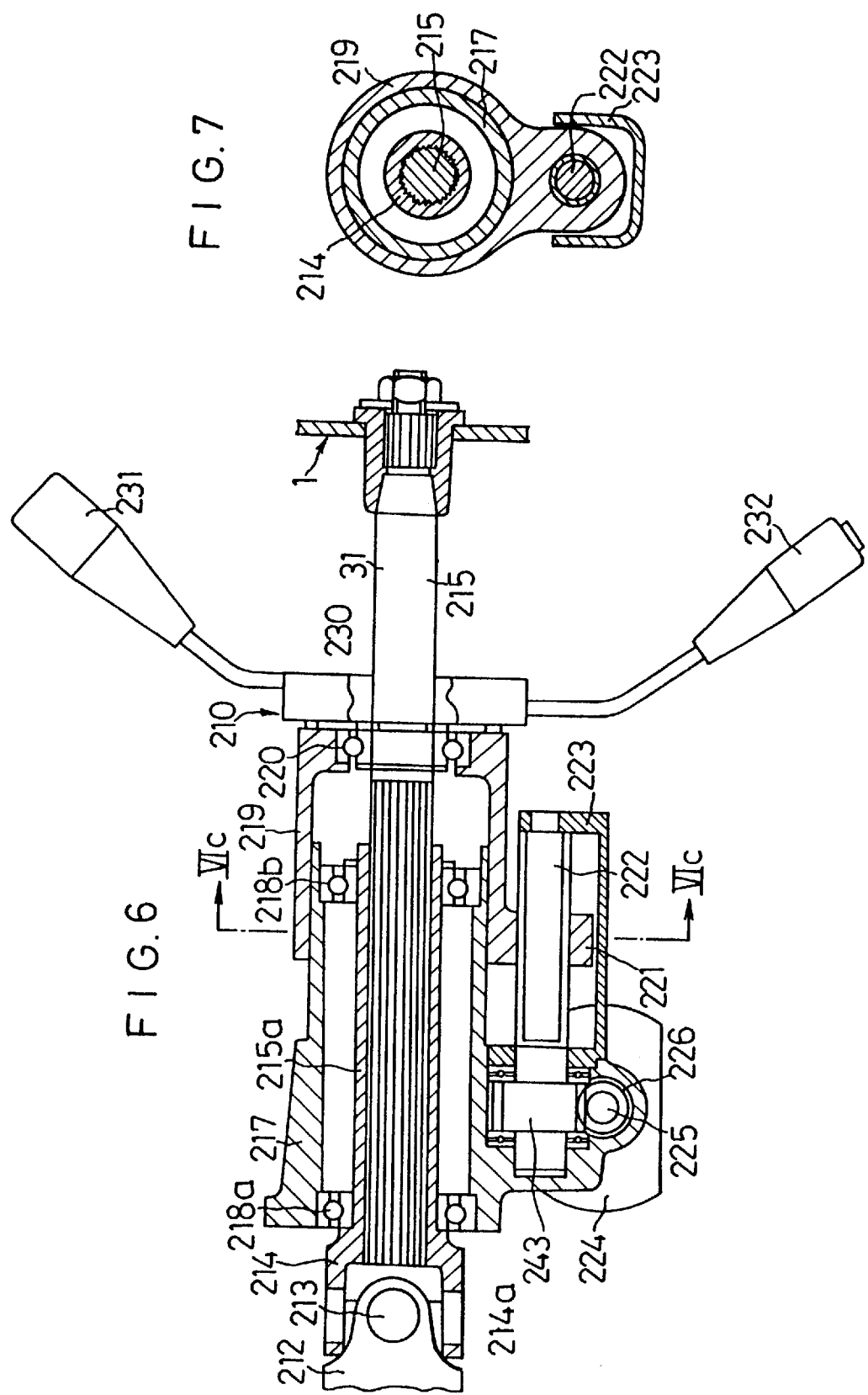

METHOD AND APPARATUS FOR CONTROLLING POSITIONS OF MEMBERS PROVIDED ON A CAR

This is a Continuation of application Ser. No. 07/830,455 filed Feb. 5, 1992 now abandoned, which is a Continuation of application Ser. No. 07/501,579 filed Mar. 30, 1990 now abandoned.

BACKGROUND OF THE INVENTION

1. Field of the Invention

The present invention relates to a method of and apparatus for controlling the positions of members provided on a car. More particularly, the present invention relates to a method of and apparatus for setting under control the positions of members provided on a car, for example, a driver's seat, steering wheel, mirrors, etc.

2. Description of the Related Art

Position control apparatuses have heretofore been known wherein the positions of members provided on a car, for example, a driver's seat, steering wheel, mirrors, etc., are controlled by driving the associated motors.

One type of the known position control apparatuses employs a microcomputer for position control, as disclosed, for example, in Japanese Patent Application Laid-Open Publication (KOKAI) Nos. 58-75217 (1983) and 58-157962 (1983).

Incidentally, recent cars are equipped with a large number of mechanisms the positions of which are to be controlled, for example, a slide mechanism for positioning a seat, a front vertical mechanism for adjusting the height of the front part of the seat, a rear vertical mechanism for adjusting the height of the rear part of the seat, a reclining mechanism for adjusting the degree of inclination of the seat back, a head rest mechanism for adjusting the height of the head rest, a steering column tilt mechanism for adjusting the degree of inclination of the steering wheel, and various kinds of mirrors.

These mechanisms can be set to proper positions by driving the associated motors under the control of a microcomputer.

Such a position control apparatus suffers, however, from the following problems. Since a large number of position control mechanisms provided on the car are controlled by a single microcomputer, the speed of processing executed to activate each position control mechanism is low and a relatively long time is therefore required to effect position adjustment.

In this conventional position control apparatus, a plurality of position control mechanisms which are provided on the car apart from each other are connected to the microcomputer through signal lines or the like and a relatively long time is therefore needed to control each position control mechanism from the microcomputer, which constitutes a cause of delay in effecting position control.

To solve these problems, it has heretofore been common practice to use a plurality of microcomputers for controlling respective position control blocks, thereby reducing the number of jobs (tasks) assigned to each individual microcomputer, and thus enabling position control to be effected at high speed.

However, such a conventional practice needs to enable the positions of the seat, the steering wheel, the mirrors, etc. to be properly changed in accordance with the bodily shape and seated position which are peculiar to each individual driver.

In the prior art, therefore, for each position control mechanism proper positions which are conformable to a plurality of different driver's bodily shapes, for example, are previously set and stored in a memory incorporated in each microcomputer, and the positions of the seat, steering wheel, mirrors, etc. are adjusted to respective proper positions on the basis of the proper positions set for each position control mechanism and information concerning, for example, a specific driver's bodily shape based on the bodily shape of each individual driver.

In this conventional position control apparatus, a seat position control block, steering wheel position control block and mirror position control block can be controlled by ON/OFF operation of switches which are used to instruct these blocks to reproduce respective positions stored in the memories.

In the above-described position control apparatus, however, the position control blocks of position control mechanisms operate asynchronously and the read timings of the position control blocks are different from each other.

Accordingly, the prior art apparatus involves the problem that, particularly when the driver keeps the position control switch turned on for a relatively short period of time, even if some position control blocks read the on-state of the position control switch, other position control blocks may be unable to read it.

The position control apparatus has therefore fears that, although the driver has properly effected the position control of the seat by actuating the position control switch after getting into the car, it may be impossible to properly adjust the position of the mirrors, for example, and that the driver may become aware that the positions of the mirrors are improper after starting the car, considering the position adjustment to have been all completed.

The above-described position control apparatus has a plurality of independent microcomputers to control a large number of position control blocks on the basis of a single position adjustment instruction given, for example, by a switch operation, and therefore suffers from the problems that the position control is complicated and the cost is increased.

SUMMARY OF THE INVENTION

It is an object of the present invention to provide a method of controlling the positions of members provided on a car, wherein the communication condition between position control blocks is watched by means of a 1-pulse signal, thereby enabling two position control blocks to be readily controlled in connection with each other.

It is another object of the present invention to provide an apparatus which is suitably employed to carry out the above-described position control method.

According to the present invention, there is provided a method of controlling the positions of position-controlled means provided on a car, comprising: controlling the positions of the position-controlled means by a plurality of position control means on the basis of control signals transmitted from a host position control means through a transmitting means; sending a 1-pulse answer signal to the host position control means from each of the position control means after receiving the signals therefrom through a returning means; and recognizing the fact that there is an abnormality in the communication system by an abnormality recognizing means when no answer signal is returned from the returning means in response to a control signal transmitted from the host position control means.

In addition, the present invention provides an apparatus for controlling the positions of position-controlled means provided on a car, comprising: a host position control means provided on the car for controlling the positions of the position-controlled means; a plurality of position control means for effecting position control on the basis of host position control signals transmitted from the host position control means; a returning means for sending a 1-pulse answer signal to the host position control means after receiving host position control signals transmitted to the position control means; and an abnormality recognizing means for recognizing the fact that there is an abnormality in the communication system when no answer pulse is returned from the returning means in response to a control signal transmitted from the host position control means.

The positions of position-controlled means provided on a car are controlled by a host position control means through a plurality of position control means which are controlled on the basis of control signals transmitted from the host position control means.

After receiving the signal transmitted from the host position control means, each position control means sends a 1-pulse answer signal to the host position control means through a returning means.

When the returning means sends no answer signal in response to a control signal transmitted from the host position control means, an abnormality recognizing means recognizes the fact that there is an abnormality in the communication system.

Accordingly, any abnormality occurring in the communication system is promptly detected and it is therefore possible to quickly cope with the abnormal situation.

Since an abnormality in the communication system can be recognized by means of a 1-pulse answer signal, the time required for the control can be shortened and it is therefore possible to quickly adjust the seat position, for example, in conformity to each individual driver's bodily shape.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which:

FIGS. 4 to 11 respectively show objects of position control effected by the present invention;

DESCRIPTION OF THE PREFERRED EMBODIMENTS

One embodiment of the present invention will be described below in detail with reference to FIG. 1 to 33.

Figure 1:
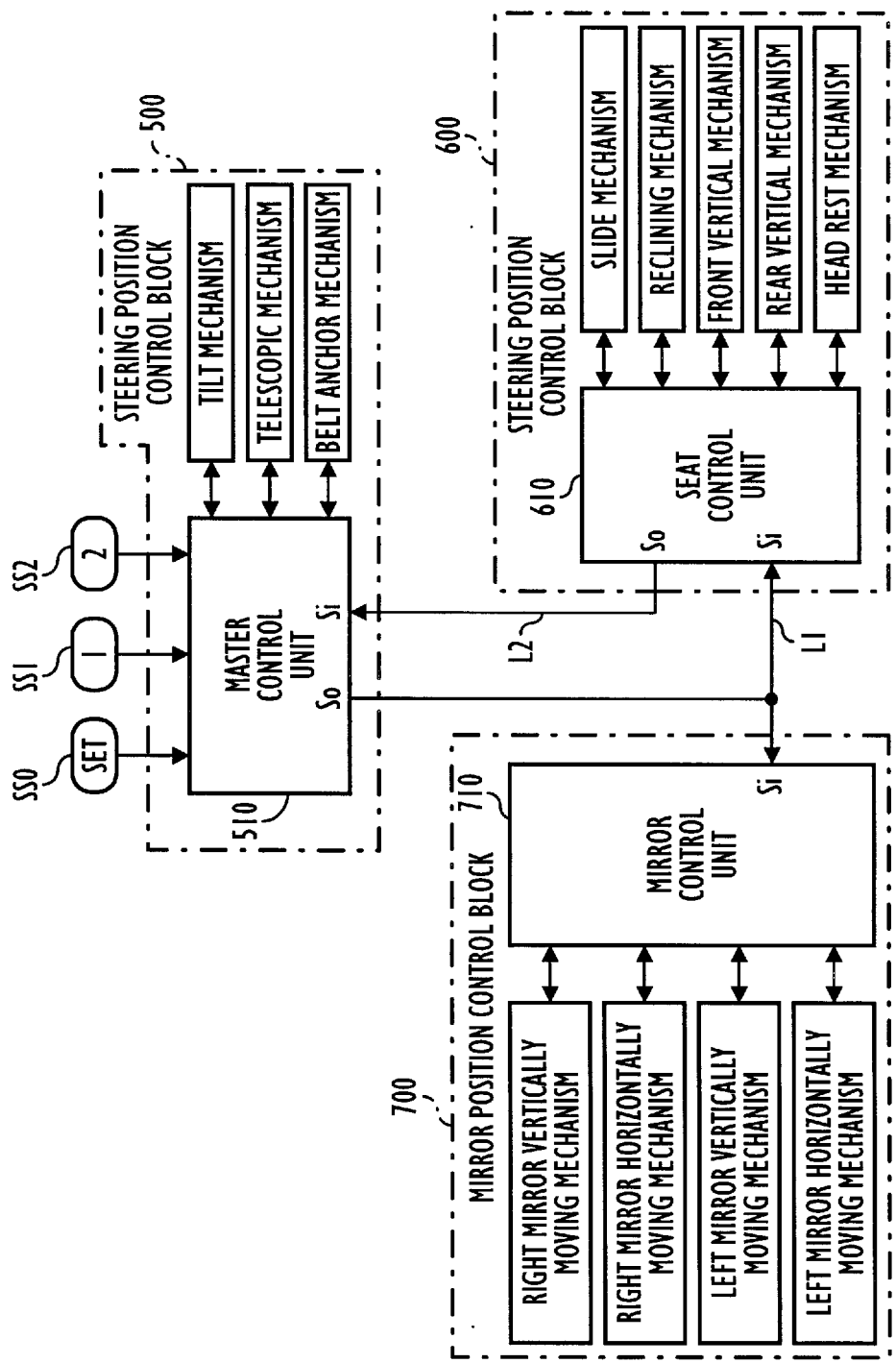
FIG. 1 is a block diagram showing the general arrangement of one embodiment of the present invention.

Referring first to FIG. 1, which is a block diagram showing the general arrangement of one embodiment of the present invention, the position control apparatus of the present invention has, for example, a steering position control block 500 serving as a host position control means, a seat position control block 600 and a mirror position control block 700.

The steering position control block 500 includes a tilt mechanism for adjusting the degree of vertical inclination of the steering wheel, a telescopic mechanism for adjusting the axial position (i.e., length) of the steering wheel, and a belt anchor mechanism for adjusting the position of the seat belt anchor.

These mechanisms are individually controlled by a master control unit 510 which incorporates a microcomputer.

The seat position control block 600 includes a slide mechanism for adjusting the longitudinal position of the seat cushion of the driver's seat, i.e., the position of the seat cushion in the lengthwise direction of the car, a reclining mechanism for adjusting the degree of inclination of the seat back, a front vertical mechanism for adjusting the height of the front part of the seat cushion, a rear vertical mechanism for adjusting the height of the rear part of the seat cushion, and a mechanism for adjusting the position (height) of the head rest. These mechanisms are controlled by a seat control unit 610 which incorporates a microcomputer.

The mirror position control block 700 includes a right mirror vertically moving mechanism for adjusting the degree of vertical inclination of the mirror attached to the right-hand door about the horizontal axis, a right mirror horizontally moving mechanism for adjusting the degree of horizontal inclination of the right mirror about the vertical axis, a left mirror vertically moving mechanism for adjusting the degree of vertical inclination of the mirror attached to the left-hand door about the horizontal axis, and a left mirror horizontally moving mechanism for adjusting the degree of horizontal inclination of the left mirror about the vertical axis. These mechanisms are controlled by a mirror control unit 710 which incorporates a microcomputer.

In this embodiment, three switches SS0 to SS2 are connected to the master control unit 510 to start and control the whole control apparatus by actuating these switches SS0 to SS2. The switch SS0 is used to store positions in memory for each control block and reproduce the desired position; the switch SS1 is used to select, for example, a first group of position storing memories; and the switch SS2 is used to select, for example, a second group of position storing memories.

In this embodiment, the master control unit 510, the seat control unit 610 and the mirror control unit 710 are interconnected through communication signal lines L1 and L2.

More specifically, in this embodiment the master control unit 510, the seat control unit 610 and the mirror control unit 710 are interconnected through the communication signal line L1 at a serial signal output terminal So of the master control unit 510 and serial signal input terminals Si of the seat and mirror control units 610 and 710, while a serial signal output terminal So of the seat control unit 610 is connected to a serial signal input terminal Si of the master control unit 510 through the communication signal line L2.

Accordingly, in this embodiment the master control unit 510 and the seat control unit 610 are capable of two-way communication with each other, while the master control unit 510 and the mirror control unit 710 are capable of one-way communication with each other.

Figure 2:
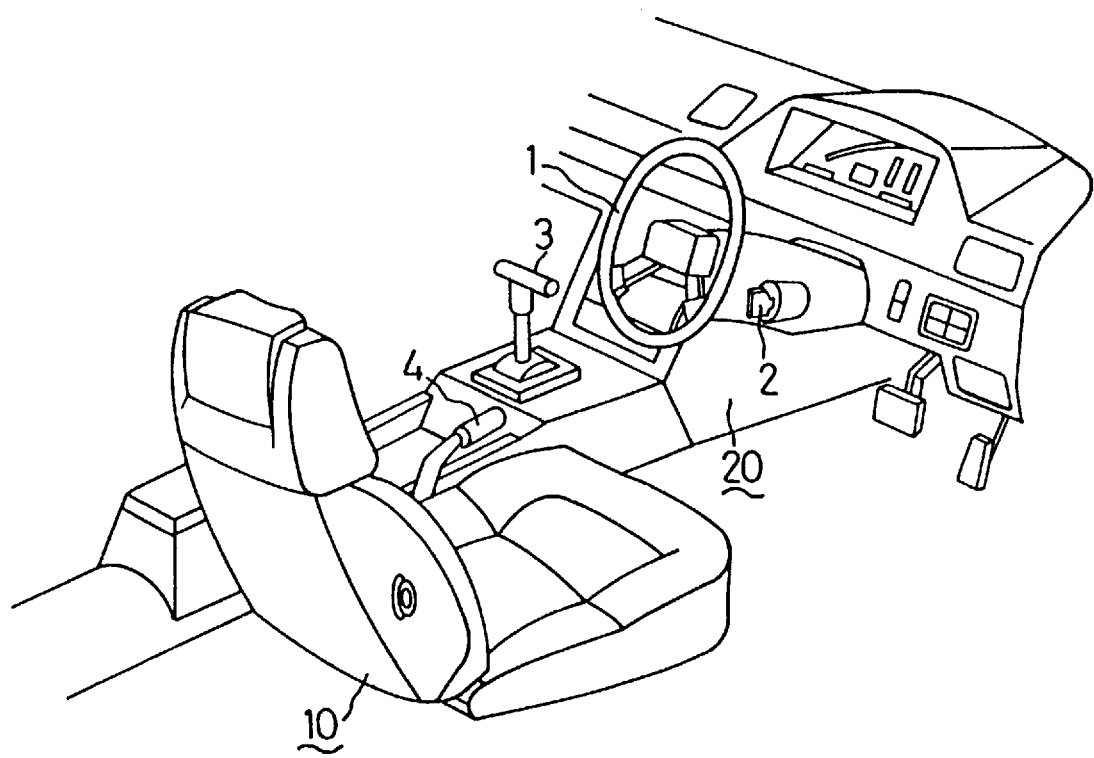
FIG. 2 shows a part of the interior of a car which is equipped with the position control apparatus according to the present invention shown in FIG. 1.

FIG. 2 shows a part of the interior of a car which is equipped with the position control apparatus according to the present invention shown in FIG. 1.

Referring to FIG. 2, the reference numeral 1 denotes a steering wheel, 2 an engine key, 3 a shift lever, 4 a hand-brake lever, 10 a driver's seat, and 20 a steering column.

The seat 10 incorporates the slide mechanism, reclining mechanism, front vertical mechanism, rear vertical mechanism and head rest mechanism, which are shown in FIG. 1, while the steering column 20 incorporates the tilt mechanism and telescopic mechanism, shown in FIG. 1.

Figure 3:
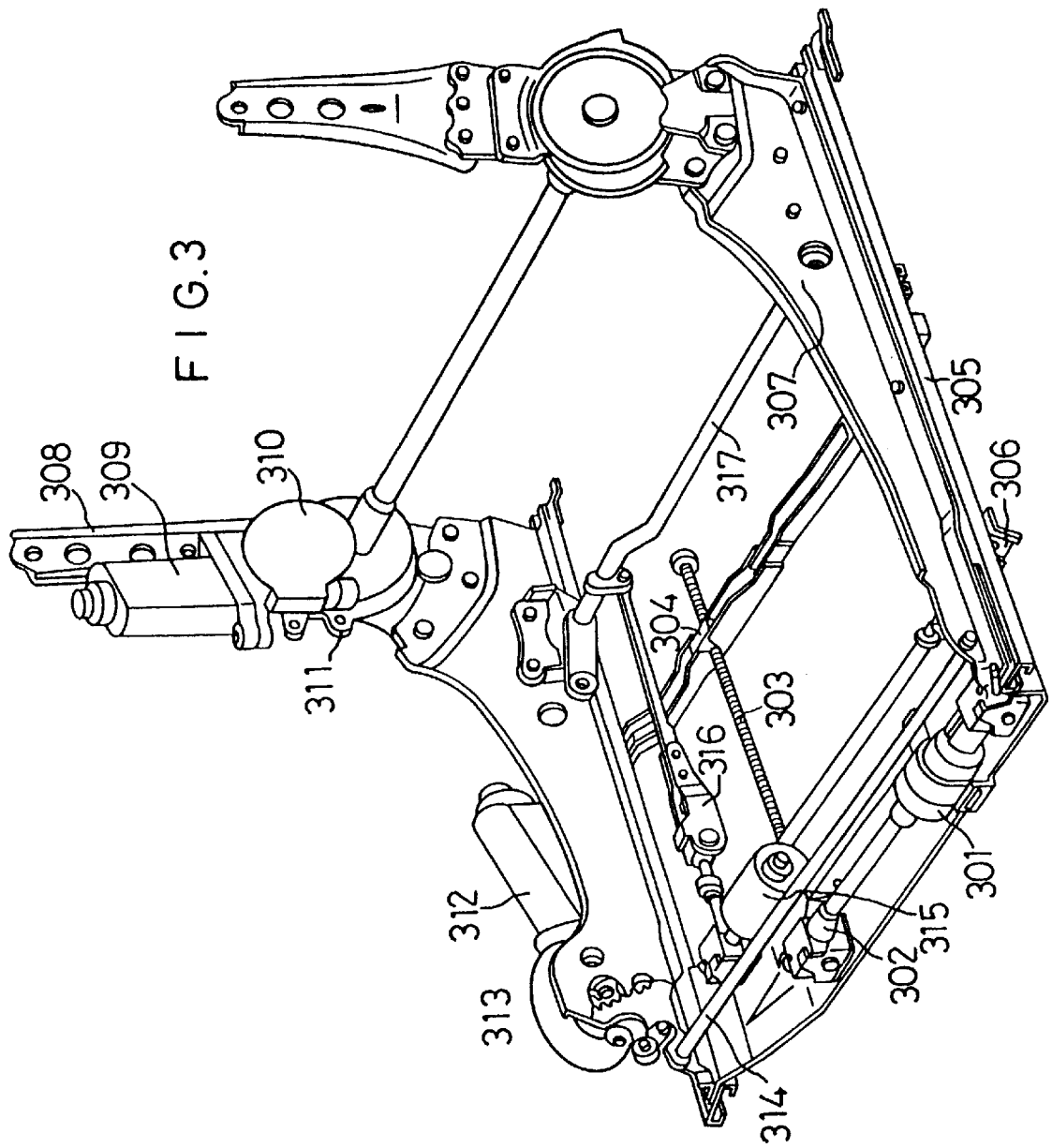
FIG. 3 shows one example of the position control mechanism disposed under the seat cushion shown in FIG. 2.

FIG. 3 shows one example of a position control mechanism which is disposed under the seat cushion of the seat 10 shown in FIG. 2.

The output shaft of a seat sliding motor 301 (MT5) is coupled to a screw 303 through a reduction gear box 302, and a nut 304 is in thread engagement with the screw 303.

Slide rails 305 are provided under a seat base 307, and the slide rails 305 are supported on fixed rails 306 fixed to the car body in such a manner that the slide rails 305 are slidable in the longitudinal direction of the car.

The gear box 302 and the screw 303 are rigidly secured to the seat base 307, while the nut 304 is rigidly secured to the fixed rails 306.

Accordingly, as the motor 301 is started, the screw 303 rotates through the gear box 302 to move relative to the nut 304, thus causing the seat base 307, that is, the seat 10 shown in FIG. 2, to slide forward or rearward.

On the other hand, a seat back frame 308 is connected to the seat base 307 in such a manner that the seat back frame 308 is capable of pivoting about an engagement portion 311.

The engagement portion 311 is provided with a gear box 310 which is connected to the driving shaft of a reclining motor 309 (MT5).

Accordingly, as the motor 309 is started, the seat back frame 308 pivots relative to the seat base 307, thus enabling the degree of inclination of the seat back to be changed as desired.

In addition, two arms 314 and 317 for raising the seat cushion are pivotally supported on the seat base 307 at the front and rear ends, respectively, such that each arm moves along a circular locus about its support point.

The front arm 314 is coupled to a gear box 313 which is connected to the driving shaft of a motor 312 for the front vertical position adjustment.

On the other hand, the rear arm 317 is coupled through a link mechanism 316 to the driving shaft of a motor 315 for the rear vertical position adjustment.

Accordingly, by starting the motor 312, the height of the arm 314 can be changed, and by changing the height of the arm 317, it is possible to change the height of the rear part of the seat cushion.

Figure 4:
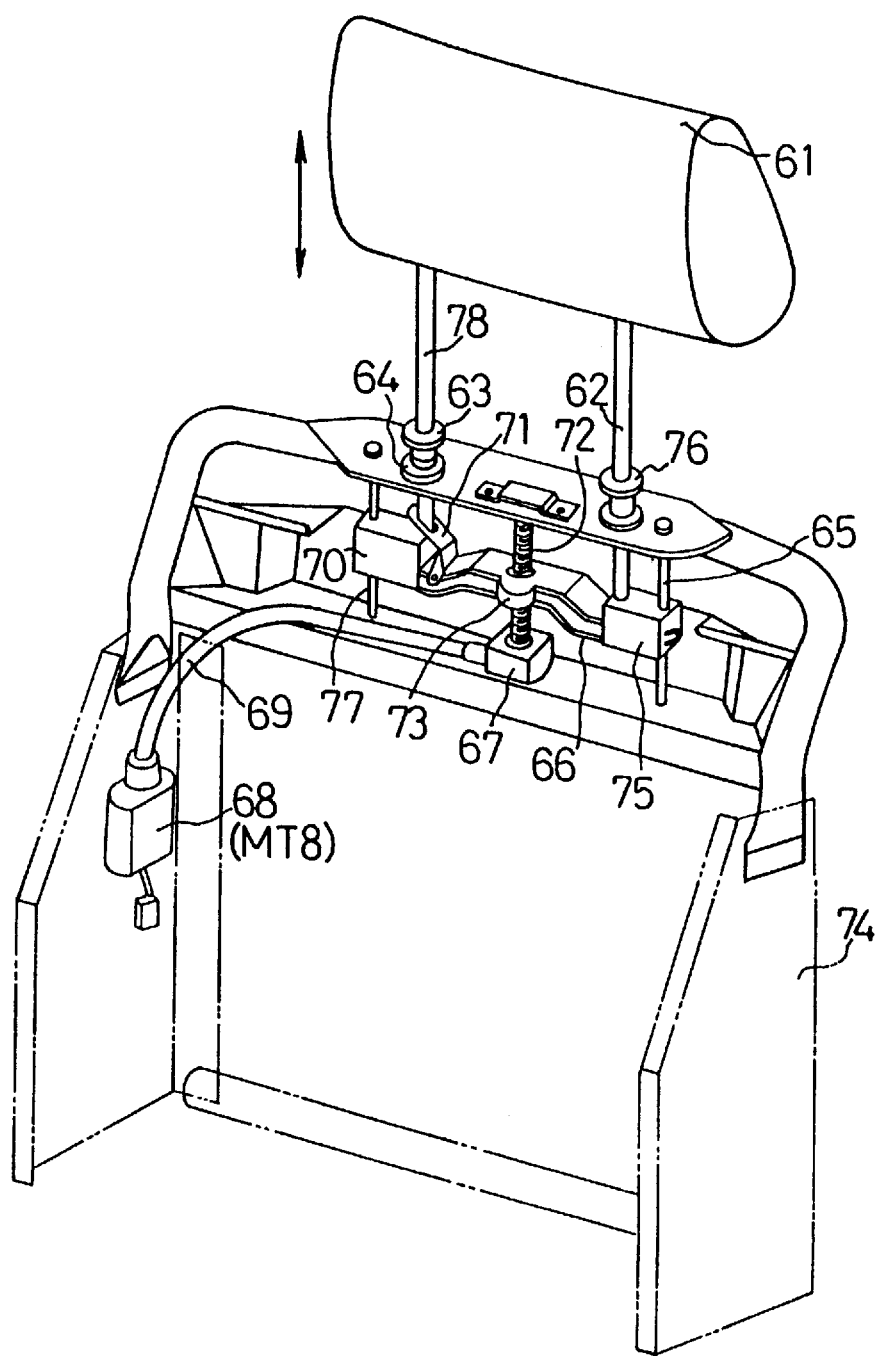

FIG. 4 shows a mechanism for adjusting the position (height) of a head rest 61 which is provided on the seat back.

In the arrangement shown in FIG. 4, two rod-shaped stays 62 and 78 are rigidly secured to the heat rest 61. These stays 62 and 78 are supported by respective stay guides 63 and 76 which are fitted in guide bores formed in a seat back frame 74. Accordingly, the stays 62 and 78 are vertically slidable.

The lower ends of the stays 62 and 78 are rigidly secured to supports 70 and 75, respectively, which are supported by respective guide rods 62 and 77 so as to be vertically movable along them. The supports 70 and 75 are coupled together through an arm 66 which has a nut 73 provided in the center thereof, and a screw 72 is in thread engagement with the nut 73.

The screw 72 is supported by the seat back frame 74 and has one end of a gear box 67 coupled to the lower end thereof. The other end of the gear box 67 is coupled to the driving shaft of a motor 68 through a driving cable 69.

Accordingly, as the motor 68 is started, the driving force therefrom is transmitted to the screw 72 through the driving cable 69 and the gear box 67, causing the screw 72 to rotate. In consequence, the arm 66 that is coupled to the nut 73 moves vertically, thus causing the supports 70 and 75 to move vertically.

It is therefore possible in this embodiment to change the height of the head rest 61 through the vertical movement of the stays 62 and 78.

Figure 5:
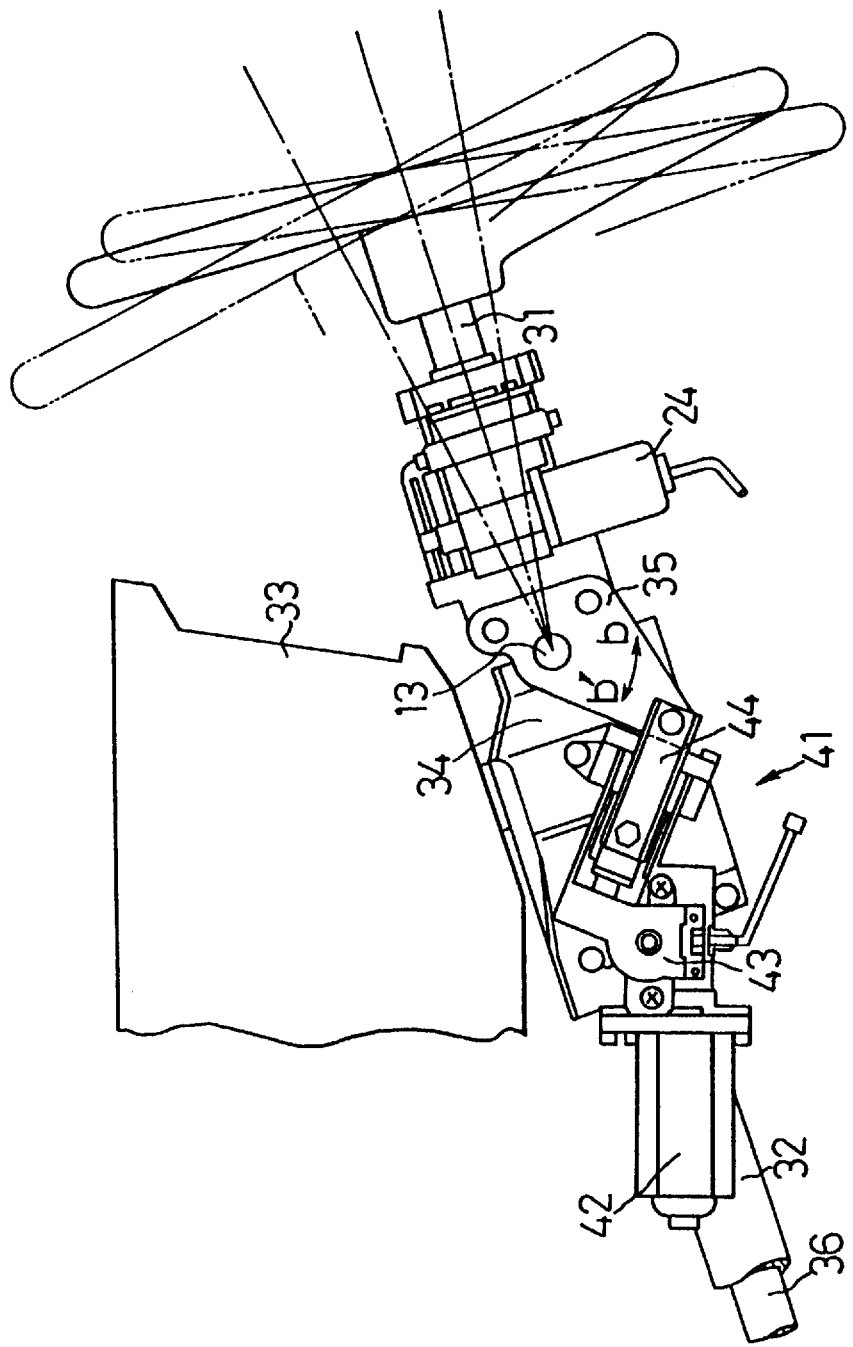

FIG. 5 shows one example of the structure of the steering column.

The tilt steering mechanism 41 shown in FIG. 5 is adapted to adjust the angle of an upper main shaft 31 with respect to a lower main shaft 36, the upper main shaft 31 having the steering wheel 1 attached thereto.

The tilt steering mechanism 41 comprises a breakaway bracket 34 secured to the lower end of a body 33 which constitutes a dash board, a motor 42 (MT1) secured to the bracket 34, a reduction mechanism 43 coupled to the motor 42, a screw-nut mechanism 44 coupled to the reduction mechanism 43, and an upper bracket 35 which is pivotally attached to the breakaway bracket 34 and pivoted by the screw-nut mechanism 44.

Accordingly, as the motor 42 in the tilt steering mechanism 41 is started, the screw-nut mechanism 44 is driven through the reduction mechanism 43 to pivot the upper bracket 35, thus changing the degree of inclination of the steering wheel 1.

FIG. 6 shows one example of a telescopic steering mechanism which is present at the side of the tilt steering mechanism 41 which is closer to the steering wheel 1, and FIG. 7 is a sectional view taken along the line VIc—VIc of FIG. 6.

Referring to these figures, the upper main shaft 31 comprises a hollow outer shaft 214 which is coupled to a shaft 212 through a joint shaft 213 serving as a tilt center and an inner shaft 215 which is fitted into the outer shaft 214 in such a manner as to be axially movable.

A steering gear (not shown) is coupled to the left (as viewed in FIG. 6) end of the shaft 212.

The right (as viewed in FIG. 6) end of the inner shaft 215 is serrated, and the support member of the steering wheel 1 is engaged with the serrated end of the shaft 215.

Accordingly, in this tilt steering mechanism 41, as the steering wheel 1 is rotated, the inner shaft 215 and the outer shaft 214 are rotated through axial serrations 215*a* and 214*a* which are respectively formed on the outer peripheral surface of the inner shaft 215 and the inner peripheral surface of the outer shaft 214, thus enabling the main shaft 212 to rotate.

The outer shaft 214 is rotatably supported through a pair of bearings 218*a* and 218*b* by a fixed bracket 217 supported on the car body through a shaft (not shown).

The inner shaft 215 is supported by a movable bracket 219 through a bearing 220. The left end portion (shown in FIG. 7) of the movable bracket 219 is fitted on the outer periphery of the right end portion of the fixed bracket 217 in such a manner as to be movable sideward as viewed in FIG. 6. The right end portion of the movable bracket 219 clamps the bearing 220, together with a retaining ring 230 engaged with the inner shaft 215.

The movable bracket 219 has a nut portion 221 formed at the lower side of the left end portion thereof. A screw 222 which is in engagement with the nut portion 221 is rotatably supported at the right end of the fixed bracket 217. A support bracket 223 is rigidly secured to the fixed bracket 217 so as to cover the screw 222 and also to ensure the space for movement of the screw 222.

The screw 222 has a gear 243 formed at the left end thereof as being an integral part of the screw 222, the gear 243 being meshed with a worm 226 secured to the driving shaft 225 of a motor 224 (MT2).

It should be noted that, since the motor 224 is secured to the fixed bracket 217, as the motor 224 rotates, the screw 222 rotates and the nut portion 221 therefore moves on the screw 222 along the axis thereof, thus causing the movable bracket 219 having the nut portion 221 to move relative to the fixed bracket 217.

Accordingly, in this embodiment the inner shaft 215 is moved outward and inward relative to the outer shaft 214, thus causing the steering wheel 1 to move along the axis of rotation thereof.

Figure 8:
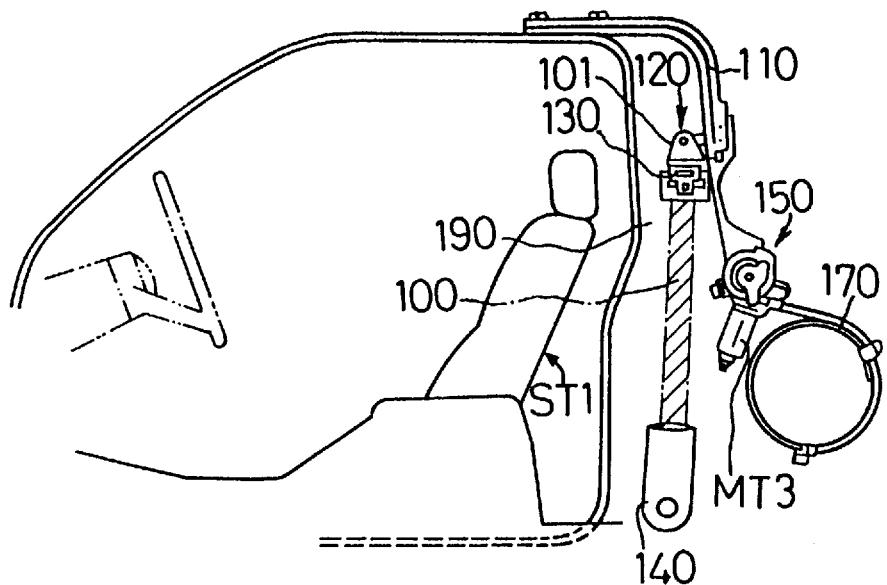
Figure 9:
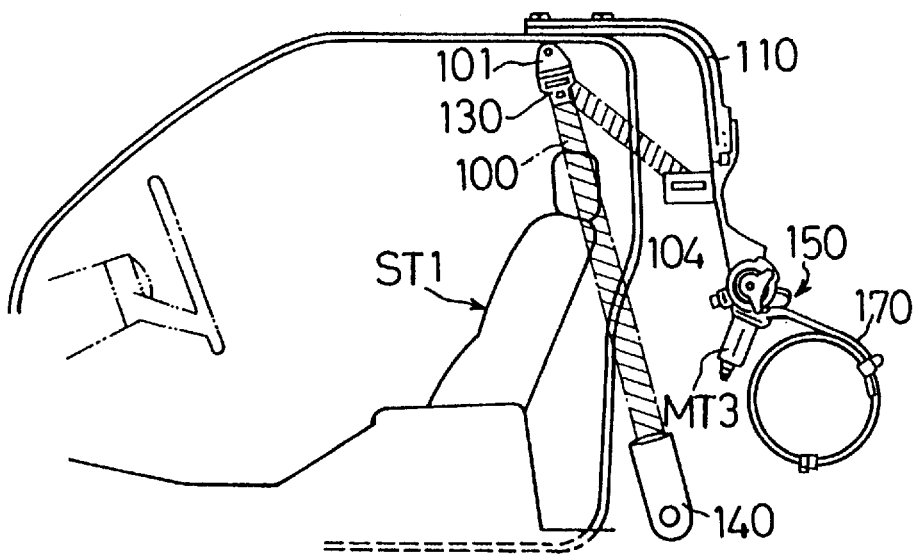

FIGS. 8 and 9 schematically show one example of a seat belt positioning mechanism. In the seat belt positioning mechanism shown in these figures, a rail 110 is laid along the periphery of a door opening where the driver gets on and off the car, that is, along the upper corner of a center pillar 190. A slider 120 having a shoulder anchor 101 mounted thereon is engaged with the rail 110 so as to reciprocate through the rail 110.

One end of the seat belt 100 is rigidly secured to a lap outer anchor 140 which is pivotally attached to the car body, and the other end of the seat belt 100 passes through a belt bore formed in the shoulder anchor 101, enters the center pillar 190 and is wound up onto a take-up member (not shown) which is provided in the lower part of the center pillar 190.

The take-up member incorporates an inertia lock mechanism designed to lock the seat belt 100 when sudden tension is applied thereto.

A tongue plate 130 is movably engaged with the seat belt 100, and a stopper (not shown) for preventing fall is attached to the tongue plate 130. Accordingly, as a motor MT3 is driven, the slider 120 is moved so as to position the seat belt 100 at the ascending position (stand-by position) shown in FIG. 8 or the descending position (fastening position) shown in FIG. 9.

Figure 10:
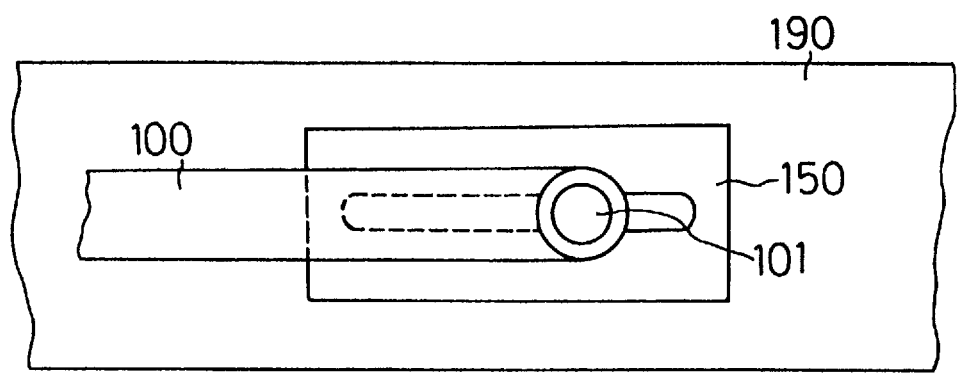
Figure 11:
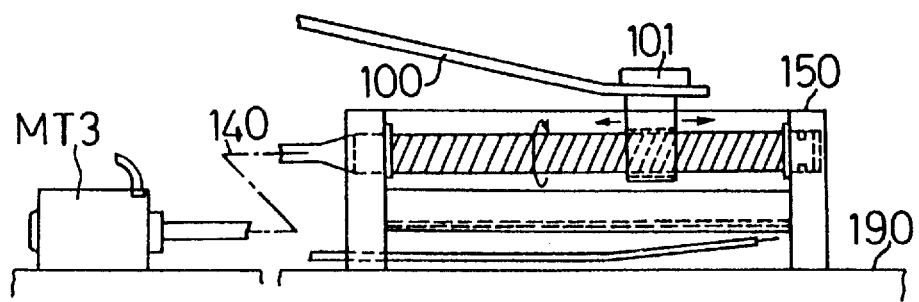

FIG. 10 is an enlarged view of a portion of the center pillar 190 where the seat belt 100 is fixed by the shoulder anchor 101, and FIG. 11 is a partly-cutaway side view of an essential part of the seat belt positioning mechanism.

Referring to these figures, the motor MT3 is the belt anchor driving motor. The output shaft of the motor MT3 is coupled to a screw 141 constituting a seat belt positioning unit through a flexible wire 140, for example, so that the screw 141 is rotated by activating the motor MT3. The lower end of the seat belt 101 is brought in slidable contact with a position sensor. Thus, the length of the seat belt 100 is properly adjusted in conformity to the bodily shape of each individual driver by activating the motor MT3 to rotate the screw 141 so as to move the seat belt anchor 101 up and down in the arrowed directions.

Figure 12:
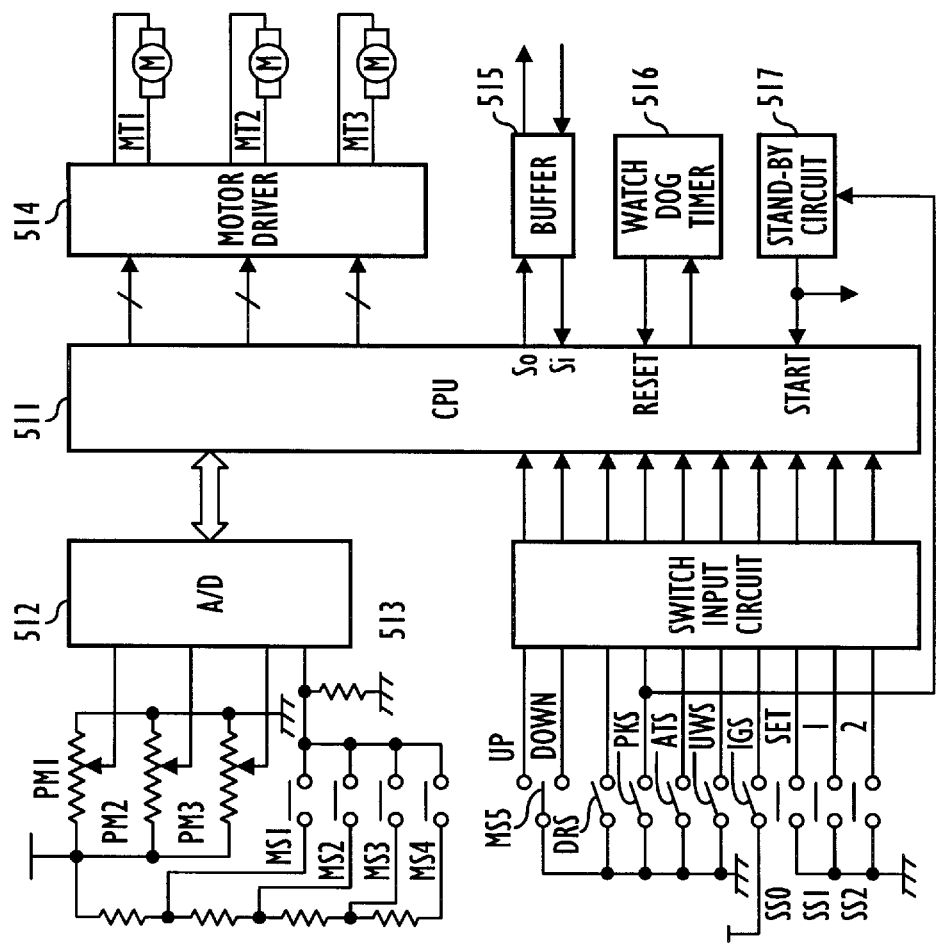
FIGS. 12 to 14 respectively show specific circuit diagrams of the control units.
Figure 13:
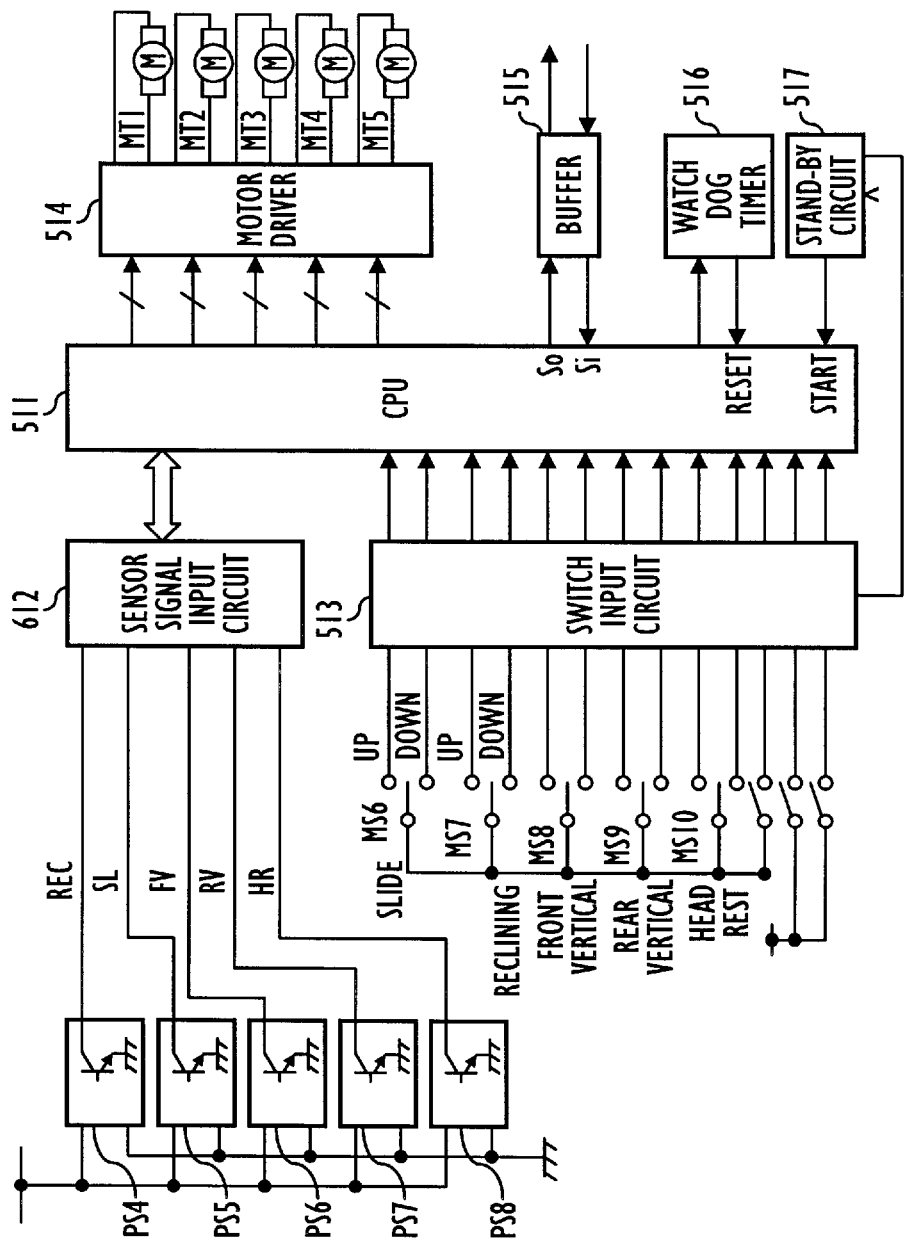
Figure 14:
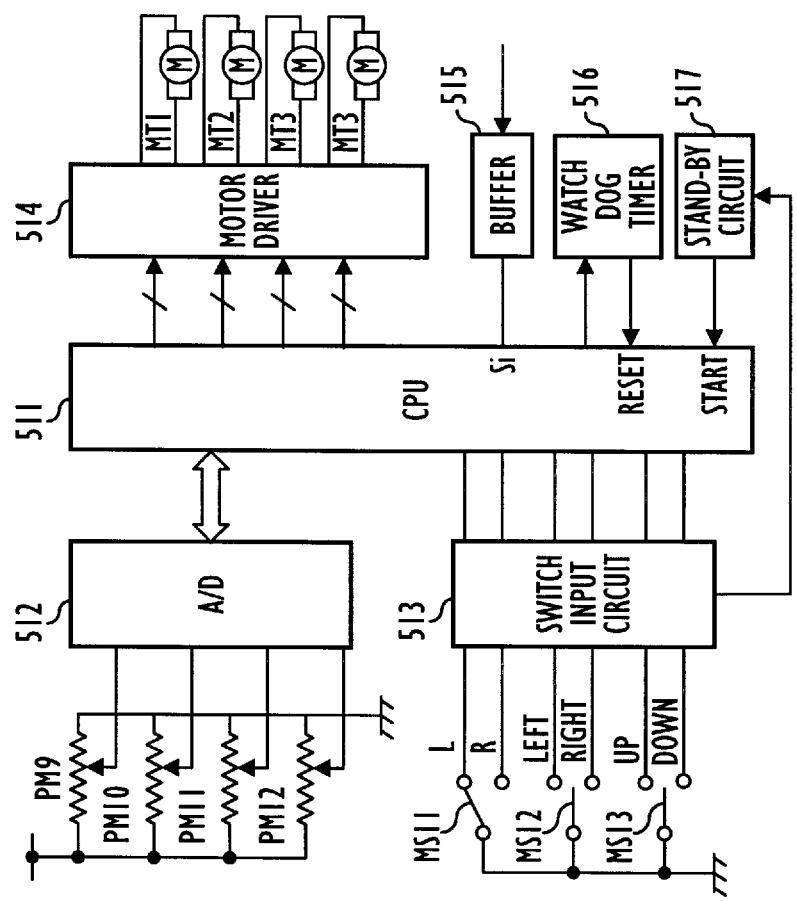

FIGS. 12 to 14 respectively show specific circuit diagrams of the master control unit 510, seat control unit 610 and mirror control unit 710 shown in FIG. 1.

Referring to FIG. 12, the master control unit 510 mainly comprises a CPU 511 which serves as a control center, an A/D converter 512 which converts an analog signal to a digital signal, a switch input circuit 513 which is a interface circuit, a motor driver 514 which activates the motors MT1 to MT3 in response to instructions from the CPU 511 to effect position control of each mechanism, a buffer 515 for temporarily storing master control signals, a watch dog timer 516 which watches the operation of the CPU 511 and properly delays the control time, and a stand-by circuit 517 for returning the CPU 511 when operating in the power saving mode to the normal mode.

In addition to these elements, various switches are connected to the above-described circuit. Switches MS1 to MS4 are manual switches which are respectively used to give an instruction to raise the tilt position, an instruction to lower the tilt position, an instruction to expand the telescopic mechanism and an instruction to contract the telescopic mechanism. These switches are connected to the A/D converter 512.

To the switch input circuit 513 is connected a switch MS5 which is a manual switch for instructing the position adjustment of the seat belt anchor.

The switch that is denoted by DRS is a door switch which turns on when the car door is opened and which turns off when it is closed.

The switch denoted by PKS is a parking switch which turns on when the transmission shift lever 3 is in the parking range and which turns off when it is not.

The switch denoted by UWS is an unlock warning switch which turns on when the engine key 2 is inserted into the key cylinder and which turns off when it is removed therefrom.

The switch denoted by IGS is an ignition switch.

Switches SS0 to SS2 are used to give instructions for position adjustment and other control operations to the steering position control mechanism, the seat position control mechanism and the mirror position control mechanism simultaneously or individually.

The CPU 511 in the master control unit 510 has a serial communication function and it is therefore possible to output serial data from an output terminal So and receive serial data at an input terminal Si.

FIGS. 13 and 14 respectively show specific circuits of the seat control unit 610 and the mirror control unit 710.

In these figures, the same constituent elements as those of the circuit shown in FIG. 12 are denoted by the same reference numerals and description thereof is omitted. The arrangements of the circuits shown in FIGS. 13 and 14 which are different from the circuit shown in FIG. 12 alone will be explained below.

The circuit shown in FIG. 13 is particularly different from the circuit shown in FIG. 12 in that it employs a sensor signal input circuit 612, manual switches MS6 to MS10, position sensors PS4 to PS8, and motors MT4 and MT5.

The circuit shown in FIG. 14 is particularly different from the circuit shown in FIG. 12 in that it employs a motor MT4, manual switches MS11 to MS13, and potentiometers PM9 to PM12.

Figure 15:
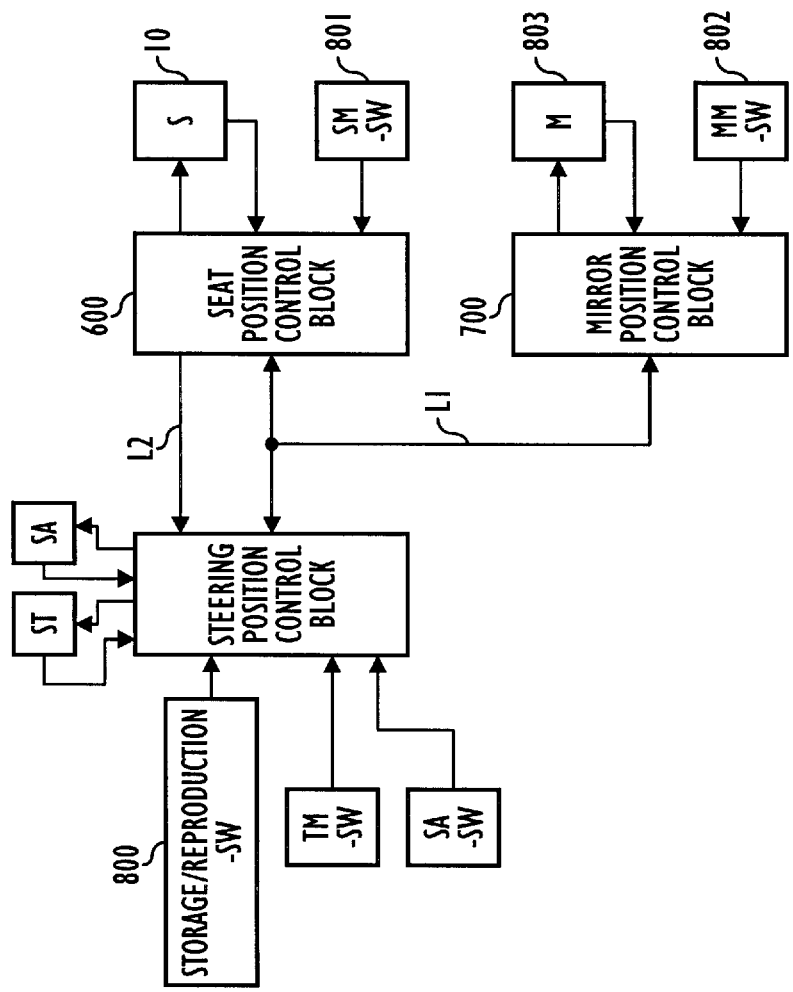
FIG. 15 is a block diagram showing a specific arrangement of one embodiment of the present invention.

FIG. 15 is a block diagram showing a specific arrangement of one embodiment of the present invention.

In regard to FIG. 15, detailed illustration of constituent elements shown in FIG. 1, such as the position control blocks 500 to 700 and the seat S, is omitted.

Referring to FIG. 15, the reference symbol ST denotes an electrically-operated tilt/telescopic steering section, SA an electrically-operated seat belt anchor section, TM-SW a tilt/telescopic steering manual switch, and SA-SW a seat belt anchor manual switch.

In addition, the reference numeral 800 denotes a storage/reproduction switch for storing positional information and reproducing the stored positions, which comprises, for example, push-button switches (M-1-2) respectively corresponding to the switches SS0 to SS2 shown in FIG. 1.

The reference symbol SM-SW 801 denotes a seat manual switch which is used to move the seat to the driver's desired position by a manual operation.

The reference numeral 803 denotes an electrically-operated outer mirror the angle of which is properly adjusted in conformity to the driver's eyes and other particular circumstances by controlling the mirror position control block 700 through a manual operation of a mirror manual switch denoted by MM-SW 802.

The electrically-operated seat belt anchor section SA is adjusted to a proper position by controlling the steering position control block 500 on the basis of signals from the storage/reproduction switch 800, the tilt/telescopic steering manual switch TM-SW, the seat belt anchor manual switch SA-SW and the electrically-operated tilt/telescopic steering section ST.

In this block diagram, when the driver pushes, for example, the push-button "1" of the storage/reproduction switch 800, the steering position control block 500 first reads the information as to the fact that push-button "1"has been pushed and sends a position control signal to each of the seat and mirror position control blocks 600 and 700.

More specifically, the steering position control block 500 sends a mirror position control signal to the mirror position control block 700 through the communication signal line L1 and also a seat position control signal to the seat position control block 600 through the communication signal L3.

In this position control apparatus, when the position control signals are sent to the seat and mirror position control blocks 600 and 700, each control block, after confirming the reception of the control signal, sends a 1-pulse reception confirming signal, i.e., so-called answer pulse, to the steering position control block 500 through the communication signal line L1 or L2.

Thus, it is possible in this position control apparatus to confirm that transfer of each signal has surely been effected by confirming the reception of the answer pulse at the steering position control block 500. It is therefore possible to immediately detect an abnormality occurring in the communication system and hence possible to quickly cope with an emergency situation.

Specific control procedures of the position control method according to the present invention will next be explained with reference to FIGS. 16 to 33, together with FIGS. 15 and others.

FIGS. 16 to 21 are flowcharts showing the signal processing procedures executed in the seat position control block 600 shown in FIG. 15.

Figure 16:
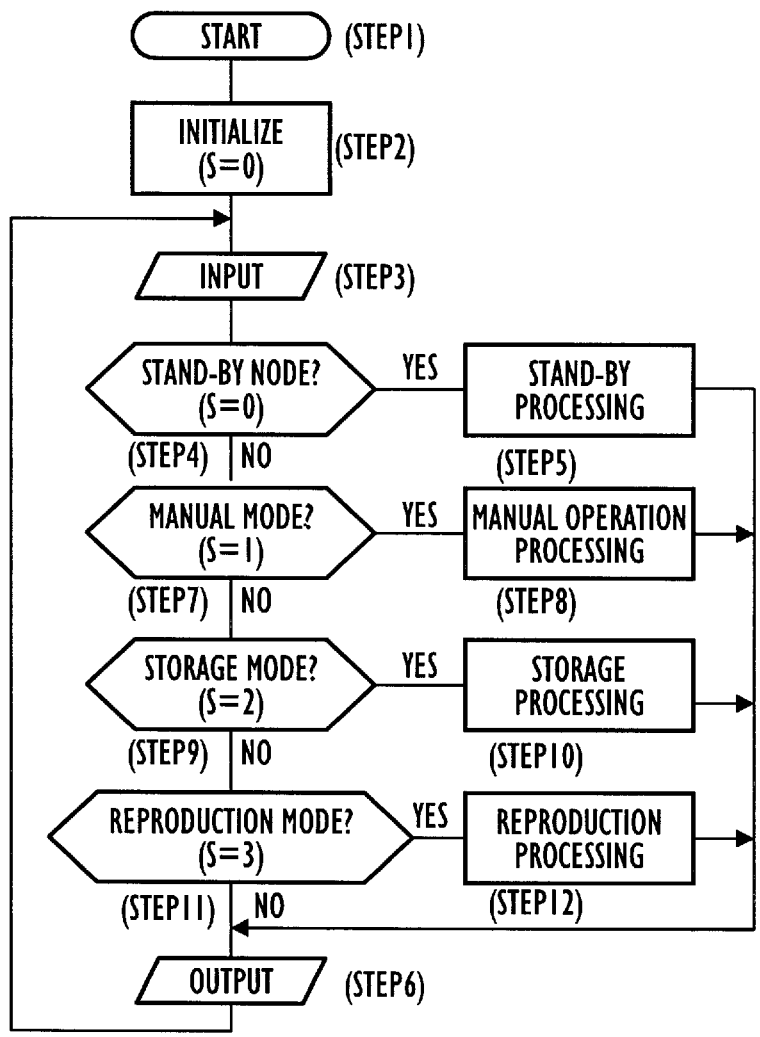
FIGS. 16 to 21 are flowcharts showing the signal processing procedures carried out in the steering position control block shown in FIG. 15.

In the signal processing procedure shown in FIG. 16, the signal processing program is first started (Step 1), and initialization is executed (Step 2).

When a seat position control signal is inputted to the steering position control block 500 from the seat position control block 600 through the communication signal line L2, as shown in FIG. 15, a first signal processing is initiated (Step 3).

Next, it is judged whether or not the system is set in the stand-by mode, i.e, S=0, (Step 4). If YES, a stand-by processing is executed (Step 5), and a processing signal is outputted from the seat position control block 600 to the steering position control block 500 through the communication signal line L2 (Step 6).

If it is judged in Step 4 that the system is not in the stand-by mode, i.e., S≠0, it is then judged whether or not the system is set in the manual mode, i.e., S=1, (Step 7).

If it is judged in Step 7 that the system is set in the manual mode, i.e., S=1, a manual operation processing is executed (Step 8), and then a processing signal is outputted from the seat position control block 600 to the steering position control block 500 through the communication signal line L2 (Step 6).

If it is judged in Step 7 that the system is not in the manual mode, i.e., S≠1, it is then judged whether or not the system is set in the storage mode, i.e., S=2, (Step 9).

If it is judged in Step 9 that the system is in the storage mode, i.e., S=2, a storage processing is executed (Step 10), and then a processing signal is outputted from the seat position control block 600 to the steering position control block 500 through the communication signal line L2 (Step 6).

If it is judged in Step 9 that the system is not in the storage mode, i.e., S≠2, it is then judged whether or not the system is set in the reproduction mode, i.e., S=3, (Step 11.

If it is judged in Step 11 that the system is in the reproduction mode, i.e., S=3, a reproduction processing is executed (Step 12), and then a processing signal is outputted from the seat position control block 600 to the steering position control block 500 through the communication signal line L2 (Step 6).

Thus, in this embodiment, after a processing signal is outputted from the seat position control block 600 to the steering position control block 500 through the communication signal line L2, a steering position control signal is inputted again to the seat position control block 600 from the steering position control block 500 (Steps 6 and 3).

Accordingly, in the present invention, steering position control signals are repeatedly inputted to the seat position control block 600 from the steering position control block 500 in accordance with the above-described processing procedure, thereby enabling the control processing to be effected reliably and speedily.

Figure 17:
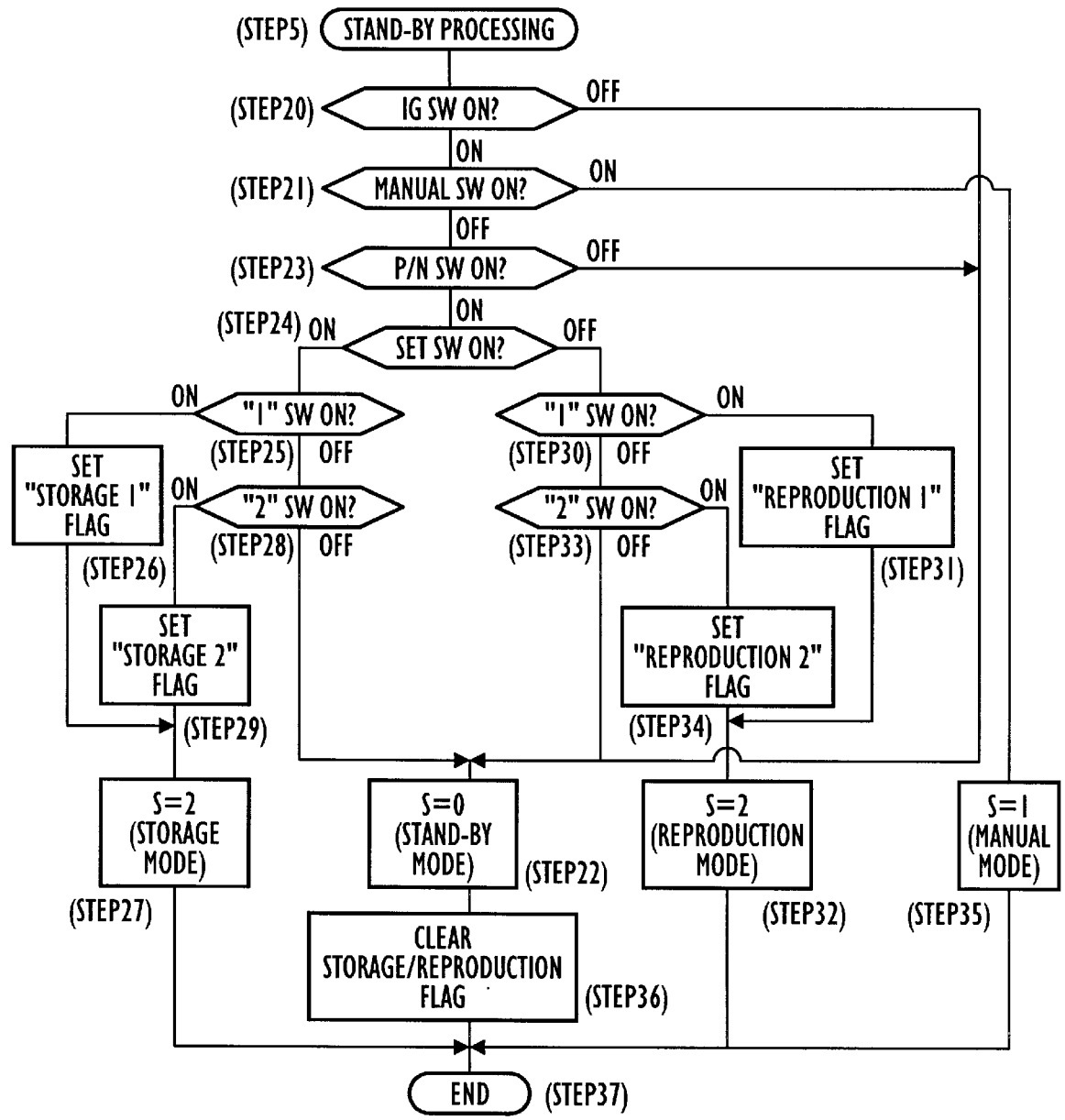

FIG. 17 shows a specific processing procedure of the stand-by processing carried out in Step 5 shown in FIG. 16. In the stand-by processing, it is first judged whether or not the ignition switch IG-SW is ON (Step 20).

If the ignition switch IG-SW is judged to be ON, it is then judged whether or not the manual switch MS is ON (Step 21).

If it is judged in Step 20 that the ignition switch IG-SW is OFF, the mode switch MS is set to the stand-by mode, i.e., S=0, (Step 22).

If the manual switch MS is OFF in Step 21, it is then judged whether or not the P/N (Parking/Neutral) switch is ON (Step 23).

If the P/N switch is judged to be OFF, the above-mentioned Step 22 is executed.

If the P/N switch is judged to be ON, it is then judged whether or not the set switch SS is ON (Step 24).

If the set switch SS is judged to be ON, it is then judged whether or not the switch "1" is ON (Step 25).

If the switch "1" is judged to be ON, the "storage 1"flag is set (Step 26), and the mode switch MS is switched over to the storage mode, i.e., S=2, (Step 27).

If the switch "1" is judged to be OFF, it is then judged whether or not the switch "2" is ON (Step 28).

If the switch "2" is judged to be ON (Step 28), the "storage 2" flag is set (Step 29), and then Step 27 is executed.

If the switch "2" is judged to be OFF in Step 28, then Step 22 is executed.

On the other hand, if the set switch SS is judged to be OFF in the above-mentioned Step 24, it is then judged whether or not the switch "1" is ON (Step 30).

If the switch "1" is judged to be ON in Step 30, the "reproduction 1" flag is set (Step 31), and the mode switch MS is switched over to S=3 to execute the reproduction mode (Step 32).

If the switch "1" is judged to be OFF in Step 30, it is then judged whether or not the switch "2" is ON (Step 33).

If the switch "2" is judged to be ON in Step 33, the "reproduction 2" flag is set (Step 33), and then Step 32 is executed.

If the manual switch MS is judged to be ON in Step 21, the mode switch MS is switched over to S=1 to execute the manual mode (Step 35).

When the stand-by mode (S=0) is executed in Step 22, the storage/reproduction flag is cleared after execution of the processing of Step 22 (Step 36).

After the processing of Step 27, 36, 32 or 35 has been executed, the stand-by processing is completed (Step 37).

The above-described stand-by processing in this embodiment enables each particular judgement to be reliably made when the system is in the stand-by state.

Figure 18:
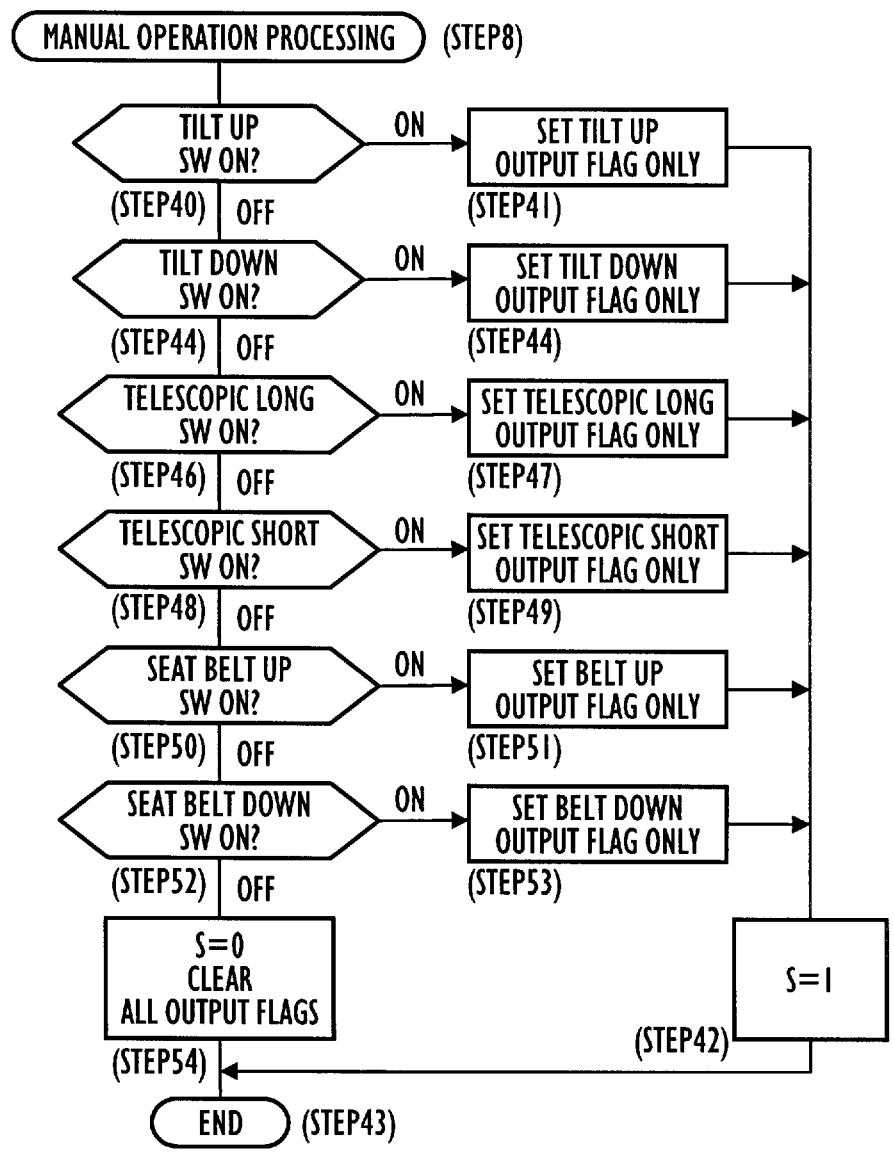

FIG. 18 shows a specific procedure of the manual operation processing carried out in Step 8 shown in FIG. 16.

First of all, it is judged whether or not the tilt "up" switch (TU-SW) is ON (Step 40).

If the tilt "up" switch (TU-SW) is judged to be ON, the tilt "up" output flag alone is set (Step 41), and the mode switch is set to S=1 (Step 42) to complete the manual operation processing (Step 43).

If the tilt "up" switch (TU-SW) is judged to be OFF in Step 40, it is then judged whether or not the tilt "down" switch (TD-SW) is ON (Step 44). If YES, the tilt "down" output flag alone is set (Step 45).

If the tilt "down" switch (TD-SW) is judged to be OFF, it is then judged whether or not the telescopic steering "long" switch (TL-SW) is ON (Step 46).

If the switch (TL-SW) is judged to be ON, the telescopic steering "long" output flag alone is set (Step 47). If the switch (TL-SW) is judged to be OFF, it is then judged whether or not the telescopic steering "short" switch (TS-SW) is ON (Step 48).

If the switch (TS-SW) is judged to be ON in Step 48, the telescopic steering "short" output flag alone is set (Step 49).

If the telescopic steering "short" switch (TS-SW) is judged to be OFF, it is then judged whether or not the seat belt "up" switch (SB-US) is ON (Step 50). If it is judged to be ON, the belt "up" output flag alone is set (Step 51).

If the seat belt "up" switch (SB-US) is judged to be OFF, it is then judged whether or not the seat belt "down" switch (SB-DS) is ON (Step 52).

If the seat belt "down" switch (SB-DS) is judged to be ON in Step 52, the belt "down" output flag alone is set (Step,53).

If the seat belt "down" switch (SB-DS) is judged to be OFF in Step 52, the mode switch is switched over to S=0 and all the output flags are cleared (Step 54), and the manual operation processing is completed (Step 43).

It should be noted that, after the processing of the above-mentioned Step 41, 45, 47, 49, 51 or 53 has been executed, the mode switch is set to S=1 (Step 42) and the the manual operation processing is completed (Step 43).

By virtue of the above-described manual operation processing, each flag is set after selection of the corresponding switch and it is therefore possible to execute the processing at high speed.

Figure 19:
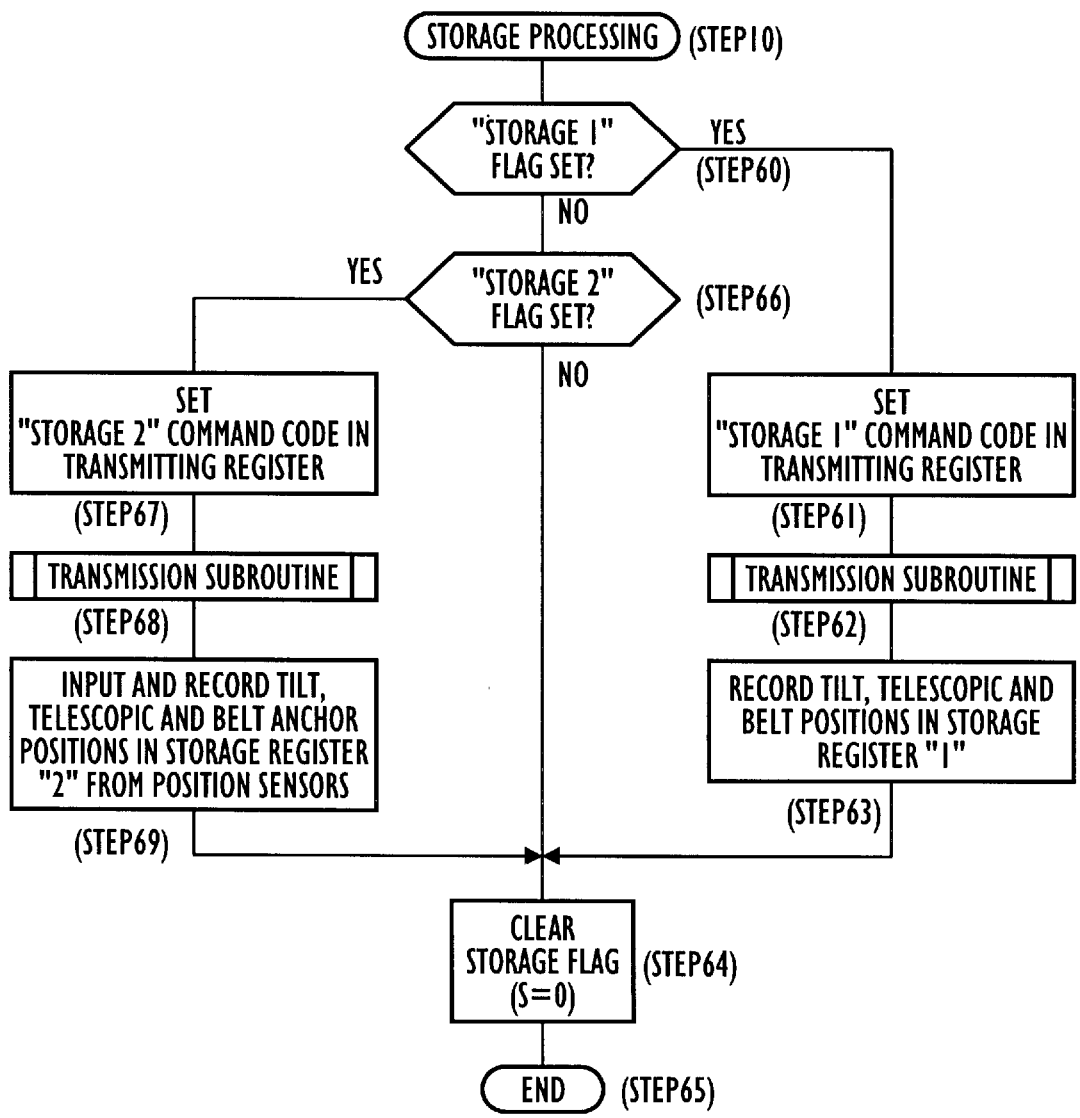

FIG. 19 shows a specific procedure of the storage processing executed in Step 10 shown in FIG. 16.

First, it is judged whether or not the storage "1" flag is set (Step 60).

If the storage "1" flag is judged to be set (Step 60), the "storage 1" command code is set in the transmitting register (Step 61), and after the transmission subroutine is executed (Step 62), the positions of the tilt, telescopic and belt anchor mechanisms are stored in the storage reister "1" (Step 63).

After the positions of the tilt, telescopic and belt anchor mechanisms have been stored in the storage register "1" (Step 63), the storage flag is cleared and the mode switch is set to S=0 (Step 64) to complete the storage processing (Step 65).

If the "storage 1" flag is judged to be not set, it is then judged whether or not the "storage 2" flag is set (Step 66).

If the "storage 2" flag is judged to be not set, Step 64 is executed and the storage processing is completed (Step 65).

If the "storage 2" flag is judged to be set, the "storage 2" command code is set in the transmitting register (Step 67), and after the transmission subroutine is executed (Step 68), the positions of the tilt, telescopic and belt anchor mechanisms are read from the position sensors PS and stored in the storage register "2" (Step 69).

Then, Step 64 is executed and the storage processing is thus completed (Step 65).

By virtue of the above-described storage processing in this embodiment, signals which are transmitted from the seat position control block 600 to the steering position control block 500, shown in FIG. 15, can be stored in memory at high speed.

Figure 20:
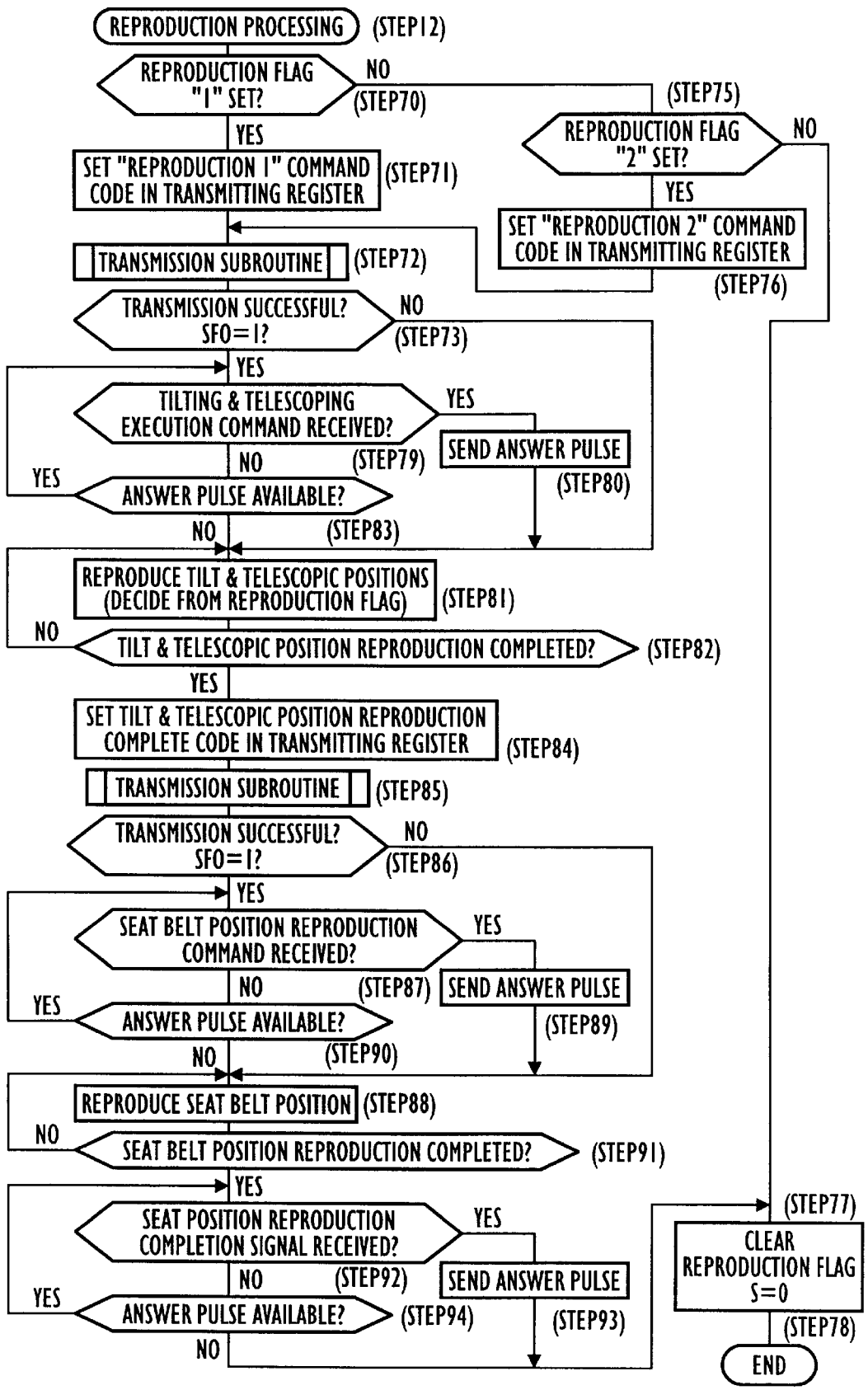

FIG. 20 shows a specific procedure of the reproduction processing executed in Step 12 shown in FIG. 16.

First, it is judged whether or not the reproduction flag is set to "1" (Step 70).

If YES is the answer in Step 70, the "reproduction 1" command code is set in the transmitting register (Step 71), and after the transmission subroutine is executed (Step 72), it is judged whether or not the transmission has been successfully done, i.e., SFO=1, (Step 73).

If the reproduction flag is judged to be not set to "1" in Step 70, it is then judged whether or not the reproduction flag is set to "2" (Step 75).

If YES is the answer in Step 75, the "reproduction 2" command code is set in the transmitting register (Step 76), and the above-mentioned transmission subroutine is executed (Step 72).

If the reproduction flag is judged to be not set to "2" (Step 75), the reproduction flag is cleared and the mode switch is set to S=0 (Step 78) to complete the reproduction processing (Step 78).

If it is judged in Step 73 that the transmission has been successfully done, i.e., SFO=1, it is then judged whether or not the tilting and telescoping execution command has been received (Step 79).

If YES is the answer in Step 79, an answer pulse AP is transmitted from the seat position control block 600 to the master control unit 510 (shown in FIG. 1) of the steering position control block 500 through the communication signal line L2 (Step 80).

Next, the master control unit 510 decides reproduction of the tilt and telescopic positions TT by referring to the reproduction flag of the answer pulse AP (Step 81) and then judges whether or not the reproduction of the tilt and telescopic positions TT has been completed (Step 82).

If it is judged in Step 79 that no tilting and telescoping execution command has yet been received, it is then judged whether or not an answer pulse AP is available (Step 83).

If it is judged in Step 83 that an answer pulse AP is available, the process returns to the above-mentioned Step 79, whereas, if no answer pulse AP is judged to be available, the above-mentioned Step 81 is executed.

If it is judged in Step 82 that the reproduction of the tilt and telescopic positions TT has already been completed, the tilt and telescopic position reproduction complete code is set in the transmitting register (Step 84), and after the transmission subroutine is executed (Step 85), it is judged whether or not the transmission has been successfully done, i.e., SFO=1, (Step 86).

If it is judged in Step 82 that the reproduction of the tilt and telescopic positions TT has not yet been completed, the process returns to Step 81.

If it is judged in Step 86 that the transmission has been Successfully done, i.e., SFO=1, it is then judged whether not the seat belt position reproduction command has been received (Step 87).

If it is judged in Step 86 that the transmission has not yet been successfully done, i.e., SFO≠1, reproduction of the seat belt position SB is executed (Step 88).

If it is judged in Step 87 that the seat belt position reproduction command has been received, an answer pulse AP is sent from the seat position control block 600 to the master control unit 510 in the steering position control block 500 through the communication signal line L2 (Step 89) to execute the above-mentioned Step 88.

If it is judged in Step 87 that no seat belt position reproduction command has yet been received, it is then judged whether or not an answer pulse AP is available (Step 90).

If it is judged in Step 90 that no answer pulse AP is available, the process proceeds to Step 88, in which reproduction of the seat belt position SB is executed, and it is then judged whether or not the reproduction of the seat belt position SB has been completed (Step 91).

If it is judged in Step 91 that the reproduction of the seat belt position SB has already been completed, it is then judged whether or not the seat position reproduction completion signal has been received (Step 92).

If it is judged in Step 91 that the reproduction of the seat belt position SB has not yet been completed, the process returns to Step 88, in which reproduction of the seat belt position SB is executed.

If it is judged in Step 92 that the seat position reproduction completion signal has been received, an answer pulse AP is sent (Step 93), and the process returns to Step 77, in which the reproduction flag is cleared, and the reproduction processing is completed (Step 78).

If it is judged in Step 92 that no seat position reproduction completion signal has yet been received, it is then judged whether or not an answer pulse AP is available (Step 94).

If it is judged in Step 94 that an answer pulse AP is available, the process returns to the above-mentioned Step 92. If it is judged in Step 94 that no answer pulse AP is available, the process returns to the above-mentioned Step 77, in which the reproduction flag is cleared, and the reproduction processing is thus completed (Step 78).

By virtue of the foregoing reproduction processing, so-called firmware processing is carried out by the above-described answer pulse AP, and it is therefore possible in this embodiment to effect reproduction processing reliably without the need to employ a costly reproduction processing device.

Figure 21:
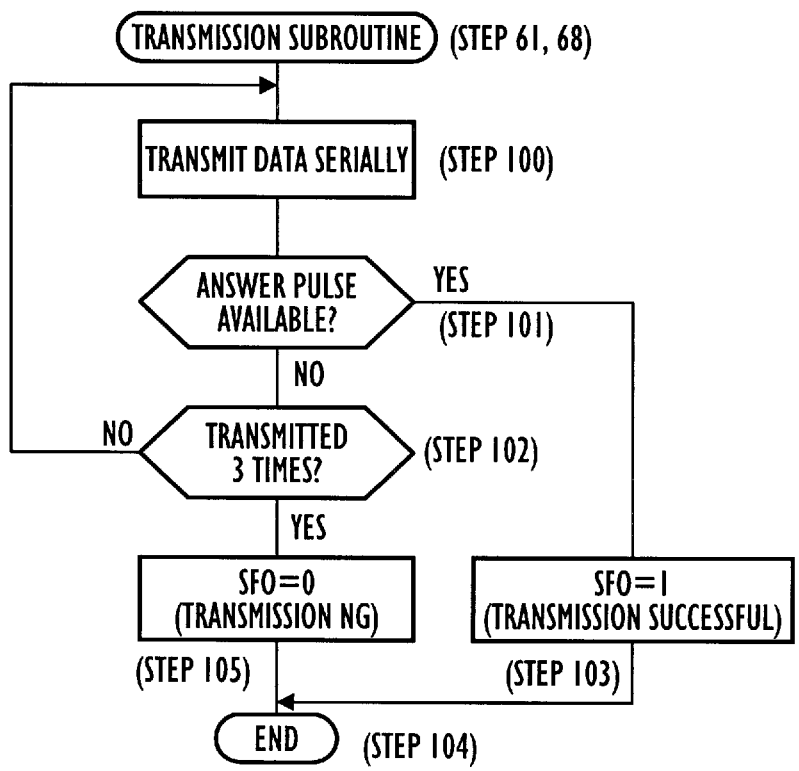

The transmission subroutine shown in FIG. 21 will next be explained. This transmission subroutine is employed in Steps 61 and 68 shown in FIG. 19.

First, the transmission subroutine is started (Step 61 or 68).

Next, transmission data is serially transmitted (Step 100), and it is then judged whether or not an answer pulse AP is available (Step 101).

If it is judged in Step 101 that no answer pulse AP is available in response to the data serially transmitted, it is then judged whether or not transmission has been carried out, for example, three times, (Step 102).

If it is judged in Step 101 that an answer pulse AP is available in response to the data serially transmitted, SFO=1 is executed to indicate that the transmission has successfully been done (step 103), and the transmission subroutine is completed (Step 104).

If it is judged in Step 102 that transmission has been carried out three times, SFO=0 is executed to indicate that the transmission was unsuccessful, i.e., N.G., (Step 105), and the transmission subroutine is completed (Step 104).

If it is judged in Step 102 that transmission has not yet been carried out three times, the process returns to the above-mentioned Step 100, in which the transmission data is serially transmitted again.

In this embodiment, transmission data is reliably sent from the seat position control block 600 to the steering position control block 500 through the communication signal line L1 by virtue of the above-described transmission subroutine. In addition, if transmission data is not transmitted from the seat position control block 600 to the steering position control block 500 through the communication signal line L1, transmission is repeated until it is successfully done. Transmission of data can therefore be reliably conducted.

Each control procedure carried out in the seat position control block 600 will next be explained with reference to FIGS. 22 to 27.

Figure 22:
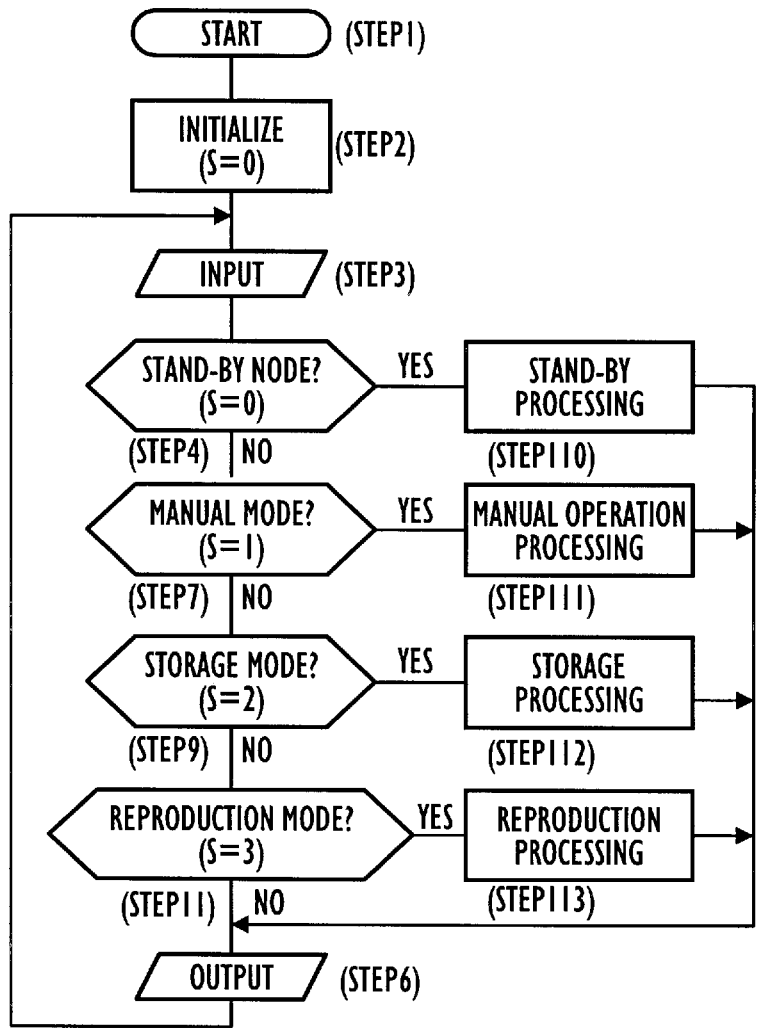
FIGS. 22 to 27 are flowcharts showing the signal processing procedures carried out in the seat position control block.

FIG. 22 is a flowchart briefly showing the procedure of processing each signal in the seat position control block 600. In the signal processing procedure shown in FIG. 22, the same processings as those in the procedure shown in FIG. 16, described above, are denoted by the same Step numbers, and detailed description thereof is herein omitted.

In the control flow shown in FIG. 22, when the operating mode is judged to be the stand-by mode (Step 4), the manual mode (Step 7), the storage mode (Step 9) or the reproduction mode (Step 11), the corresponding one of the following processings is executed, that is, the stand-by processing (Step 110), the manual operation processing (Step 111), the storage processing (Step 112) and the reproduction processing (Step 113), which will be explained below with reference to FIGS. 23 to 27.

Figure 23:
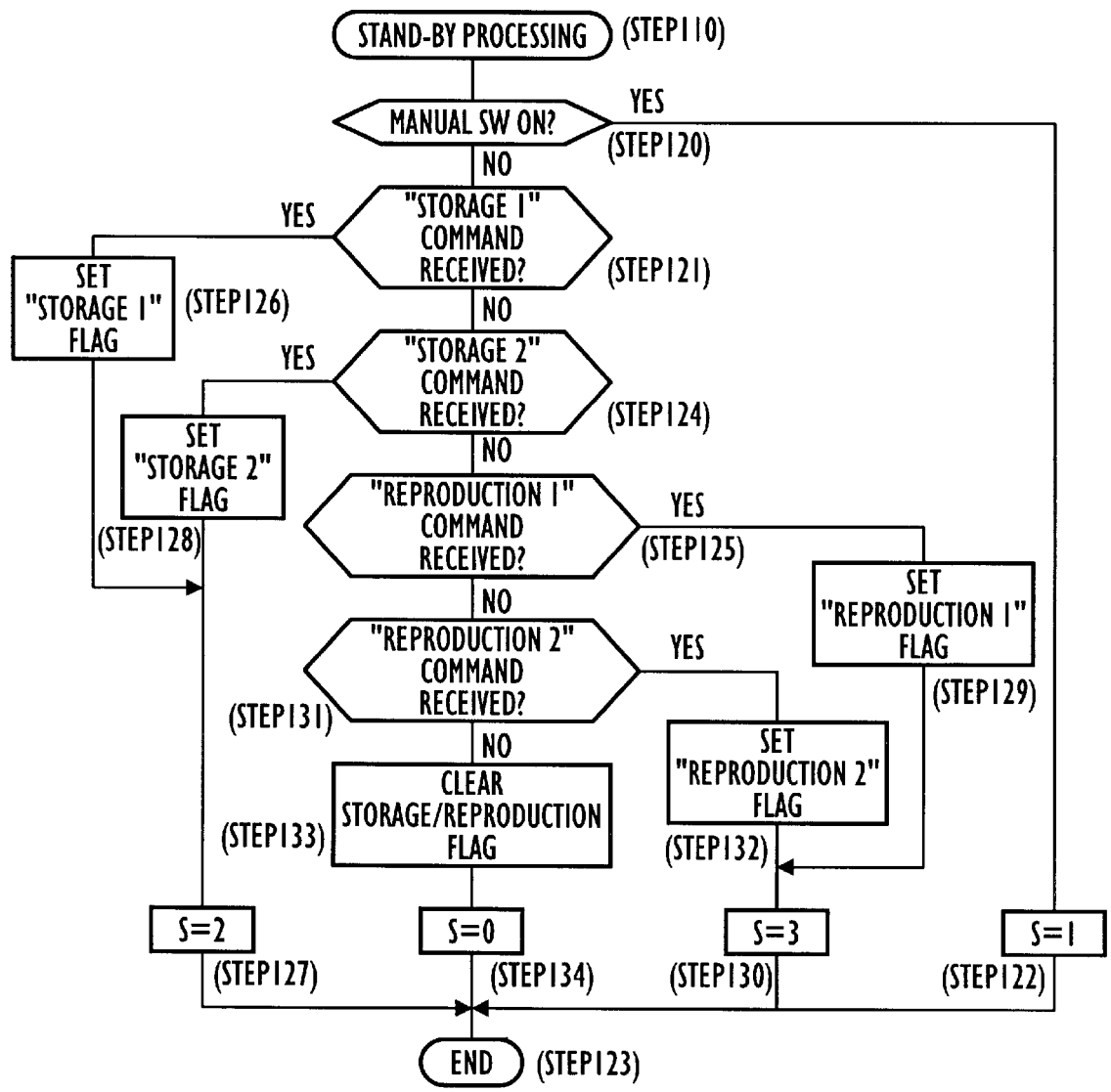

FIG. 23 shows the procedure of the stand-by processing executed in Step 110 shown in FIG. 22.

First, it is judged whether or not the manual switch MS is ON (Step 120).

If YES is the answer in Step 120, the mode switch is switched over to S=1 (Step 122), and the stand-by processing is completed (Step 123).

If it is judged in Step 120 that the manual switch MS is not ON, it is then judged whether or not the "storage 1" command has been received (Step 121).

If it is judged in Step 121 that no "storage 1" command has been received, it is then judged whether or not the "storage 2" command has been received (Step 124).

If it is judged in Step 121 that the "storage 1" command has been received, the "storage 1" flag is set (Step 126), the mode switch is switched over to S=2 (Step 127), and the stand-by processing is completed (Step 123).

If it is judged in Step 124 that the "storage 2" command has been received, the "storage 2" flag is set (Step 128), the mode switch is switched over to S=2 (Step 127), and the stand-by processing is completed (Step 123).

If it is judged in Step 124 that no "storage 2" command has been received, it is then judged whether or not the "reproduction 1" command has been received (Step 125).

If YES is the answer in Step 125, the "reproduction 1" flag is set (Step 129), the mode switch is switched over to S=3 (Step 130), and the stand-by processing is completed (Step 123).

If it is judged in Step 125 that no "reproduction 1" command has been received, it is then judged whether or not the "reproduction 2" command has been received (Step 131).

If YES is the answer in Step 131, the "reproduction 2" flag is set (Step 132), the mode switch is switched over to S=3, and the stand-by processing is completed (Step 123).

If it is judged in Step 131 that no "reproduction 2" command has been received, the storage/reproduction flag is cleated (Step 133), the mode switch is switched over to S=0 (Step 134), and the stand-by processing is completed (Step 123).

Thus, it is possible according to the present invention to execute the stand-by processing at high speed by inputting steering position control signals from the steering position control block 500 to the seat position control block 600 through the communication signal line L3 according to the above-described processing procedure.

Figure 24:
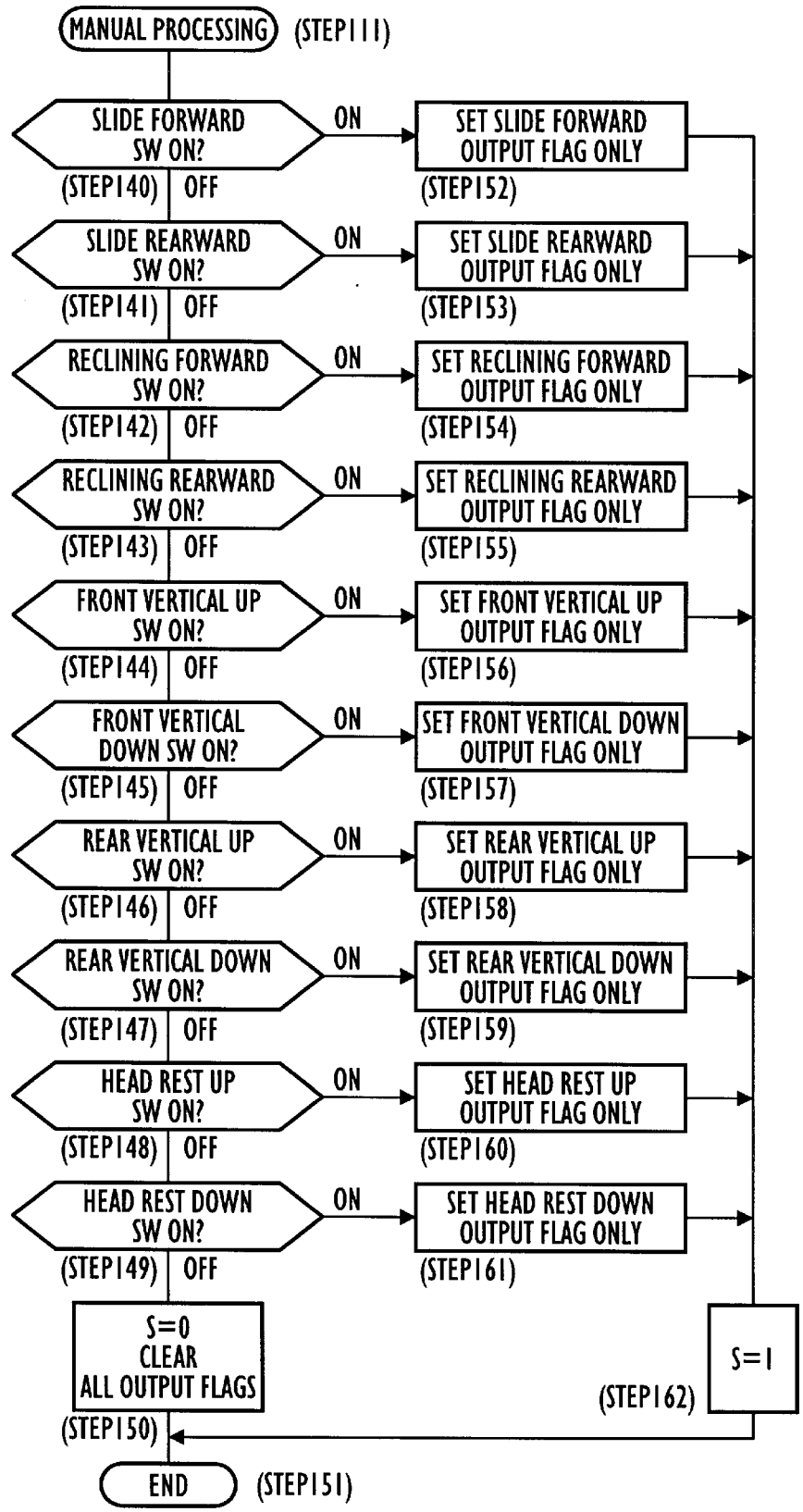

FIG. 24 shows the manual operation processing executed in Step 111 shown in FIG. 22, which is basically similar to the manual operation processing shown in FIG. 18.

Accordingly, detailed description of the flowchart of FIG. 24 is omitted and only the portions which are different from those of the flowchart shown in FIG. 18 will be explained.

Referring to FIG. 24, Steps 140 to 149 are executed to judge whether the following switches are ON or OFF, that is, the slide "forward" SW (Step 140), the slide "rearward" SW (Step 141), the reclining "forward" SW (Step 142), the reclining "rearward" SW (Step 143), the front vertical "up" SW (Step 144), the front vertical "down" SW (Step 145), the rear vertical "up" SW (Step 146), the rear vertical "down" SW (Step 147), the head rest "up" SW (Step 148) and the head rest "down" SW (Step 149).

When the switches are judged to be ON in the above-mentioned Steps, Steps 152 to 161 are executed to set the corresponding flags, respectively.

More specifically, in Step 152 the slide "forward" output flag alone is set; in Step 153 the slide "rearward" output flag alone is set; in Step 154 the reclining "forward" output flag alone is set; in Step 155 the reclining "rearward" output flag alone is set; in Step 156 the front vertical "up" output flag alone is set; in Step 157 the front vertical "down" output flag alone is set; in Step 158 the rear vertical "up" output flag alone is set; in Step 159 the rear vertical "down" output flag alone is set; in Step 160 the head rest "up" output flag alone is set; and in Step 161 the head rest "down" output flag alone is set. After any of these Steps is executed, the mode switch is switched over to S=1 (Step 162), and the manual operation processing is completed (Step 151).

In the above-described manual operation processing, each flag is set after the corresponding switch is selected, and it is therefore possible to increase the processing speed.

Figure 25:
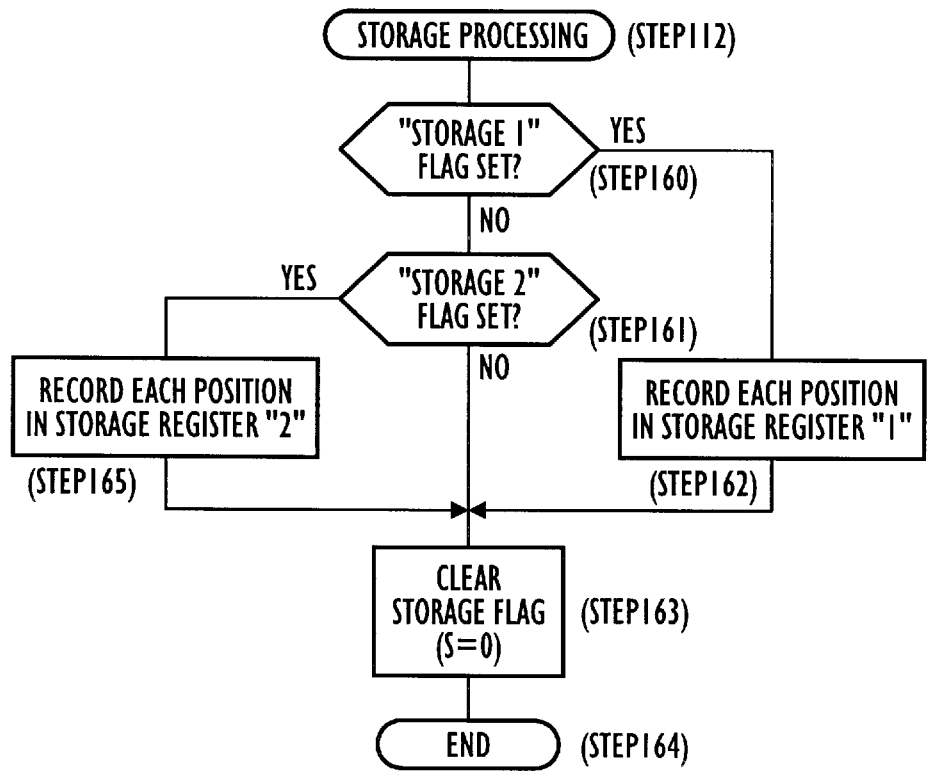

FIG. 25 is a flowchart showing the procedure of the storage processing executed in Step 112 shown in FIG. 22.

First, it is judged whether or not the "storage 1" flag has been set (Step 160). If YES is the answer in Step 160, each position is recorded in the storage register "1" (Step 162), the storage flag is cleared (Step 163), and the storage processing is completed (Step 164).

If it is judged in Step 161 that the "storage 2" flag has not been set, the mode switch is set to S=0 and the storage flag is thus cleared (Step 163), and the storage processing is completed (Step 164).

If it is judged in Step 161 that the "storage 2" flag has been set, each position is recorded in the storage register "2" (Step 165), the storage flag is cleared (Step 163), and the storage processing is completed (Step 164).

It is possible by virtue of the above-described storage processing in this embodiment to quickly store signals which are transmitted from the steering position control block 500 to the seat position control block 600.

Figure 26:
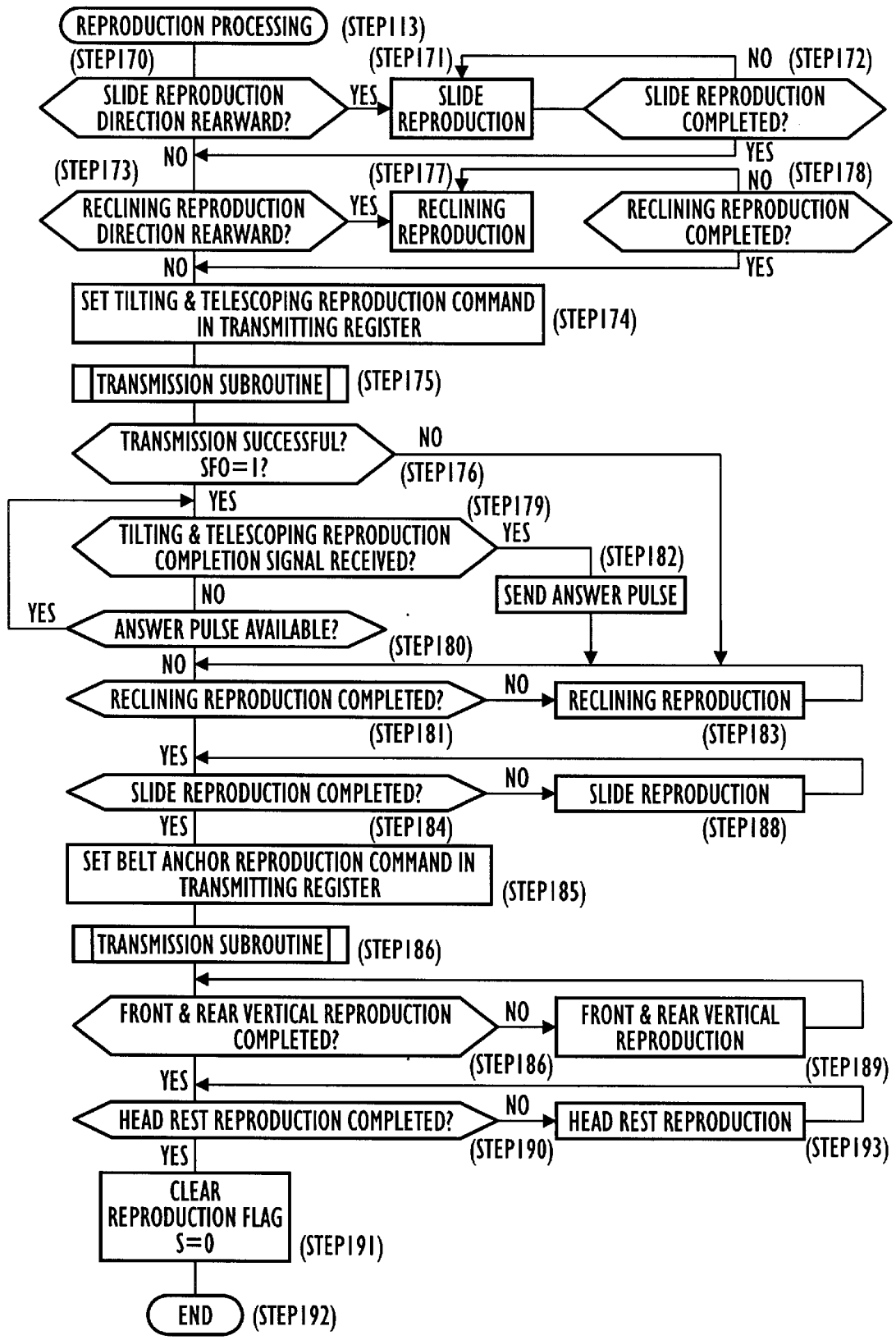

FIG. 26 shows the procedure of the reproduction processing executed in Step 113 shown in FIG. 22.

First, it is judged whether or not the direction of sliding of the seat to reproduce its position is rearward (Step 170).

If YES is the answer in Step 170, reproduction of the position of the seat in the longitudinal direction is executed (Step 171), and it is then judged whether the reproduction of the position of the seat has been completed (Step 172).

If NO is the answer in Step 172, the reproduction of the seat position is executed again (Step 171).

If it is judged in Step 170 that the direction of sliding of the seat is not rearward, it is then judged whether or not the direction of movement of the reclining seat back to reproduce its position is rearward (Step 173).

If it is judged in Step 173 that the direction of movement of the reclining seat back is not rearward, the command for reproducing the position of the tilt/telescopic steering wheel is set (Step 174), the transmission subroutine is executed (Step 175), and it is then judged whether or not the transmission has successfully been done, i.e., SFO=1 (Step 176).

If it is judged in Step 173 that the direction of movement of the reclining seat back is rearward, reproduction of the position of the reclining seat back is executed (Step 177), and it is then judged whether or not the reproduction of the reclining seat back position has been completed (Step 178).

If YES is the answer in Step 178, the above-mentioned Step 174 is executed.

If it is judged in Step 178 that the reproduction of the reclining seat back position has not yet been completed, the reproduction of the reclining seat back position is executed again (Step 177).

If it is judged in Step 176 that the transmission has successfully been done, i.e., SFO=1, it is then judged whether or not the signal representative of the completion of the reproduction of the tilt/telescopic steering wheel position has been received (Step 179).

If NO is the answer in Step 179, it is then judged whether or not an answer pulse AP is available (Step 180).

If NO is the answer in Step 180, it is then judged whether or not the reproduction of the reclining seat back position has been completed (Step 181).

If it is judged in Step 179 that the signal representative of the reproduction of the tilt/telescopic steering wheel position has been received, an answer pulse AP is sent (Step 182), and reproduction of the reclining seat back position is then executed (Step 183).

If it is judged in Step 181 that the reproduction of the reclining seat back position has been completed, it is then judged whether or not the reproduction of the seat position that is effected by the slide mechanism has been completed (Step 184).

If YES is the answer in Step 184, the command for reproducing the prosition of the belt anchor is set in the transmitting register (Step 185), the transmission subroutine is executed (Step 186), and it is then judged whether or not the reproduction of the front and rear vertical positions of the seat has been completed (Step 187).

If it is judged in Step 181 that the reproduction of the reclining seat back position has not yet been completed, reproduction of the reclining seat back position is executed (Step 183), and it is then judged whether or not the reproduction of the reclining seat back position has been completed again (Step 180).

If it is judged in Step 184 that the reproduction of the position of the seat that is effected by the slide mechanism has not yet been completed, the reproduction of the seat position is executed (Step 188), and it is then judged whether or not the reproduction of the seat position has been completed again (Step 184).

If it is judged in Step 187 that the reproduction of the front and rear vertical positions of the seat has not yet been completed, reproduction of the front and rear vertical positions of the seat is executed (Step 189), and it is then judged whether or not the reproduction of these positions has been completed (Step 187).

If it is judged in Step 187 that the reproduction of the front and rear vertical positions of the seat has already been completed, it is then judged whether or not the reproduction of the head rest position has been completed (Step 190).

If it is judged in Step 190 that the reproduction of the head rest position has been completed, the reproduction flag is cleared, that is, the mode switch is switched over to S=0, (Step 191), and the reproduction processing is completed (Step 192).

If it is judged in Step 190 that the reproduction of the head rest position has not yet been completed, reproduction of the head rest position is executed (Step 193), and it is then judged whether or not the reproduction of the head rest position has been completed (Step 190).

By virtue of the above-described reproduction processing, it is possible in this embodiment to reliably execute the reproducing processings of the slide, reclining, front/rear vertical and head rest mechanisms in the seat position control block 600.

Figure 27:
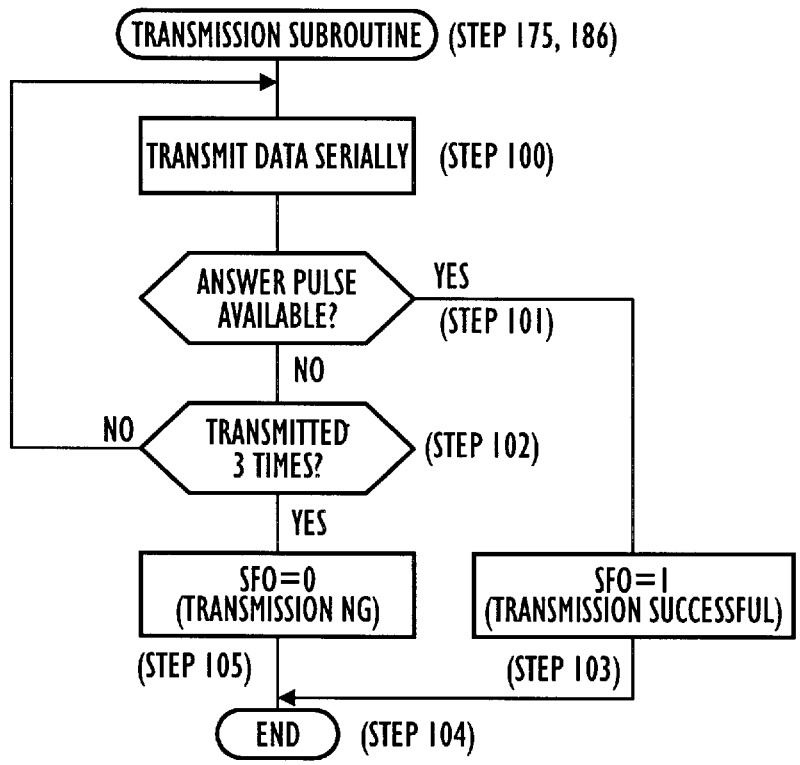

FIG. 27 is a flowchart showing the transmission subroutine executed in Steps 175 and 186 shown in FIG. 26. Since the processing procedure shown in FIG. 27 is the same as that in the transmission flowchart shown in FIG. 21, description thereof is herein omitted. See the description made in connection with FIG. 21.

Each control procedure carried out in the mirror position control block 700 will next be explained with reference to FIGS. 28 to 33.

Figure 28:
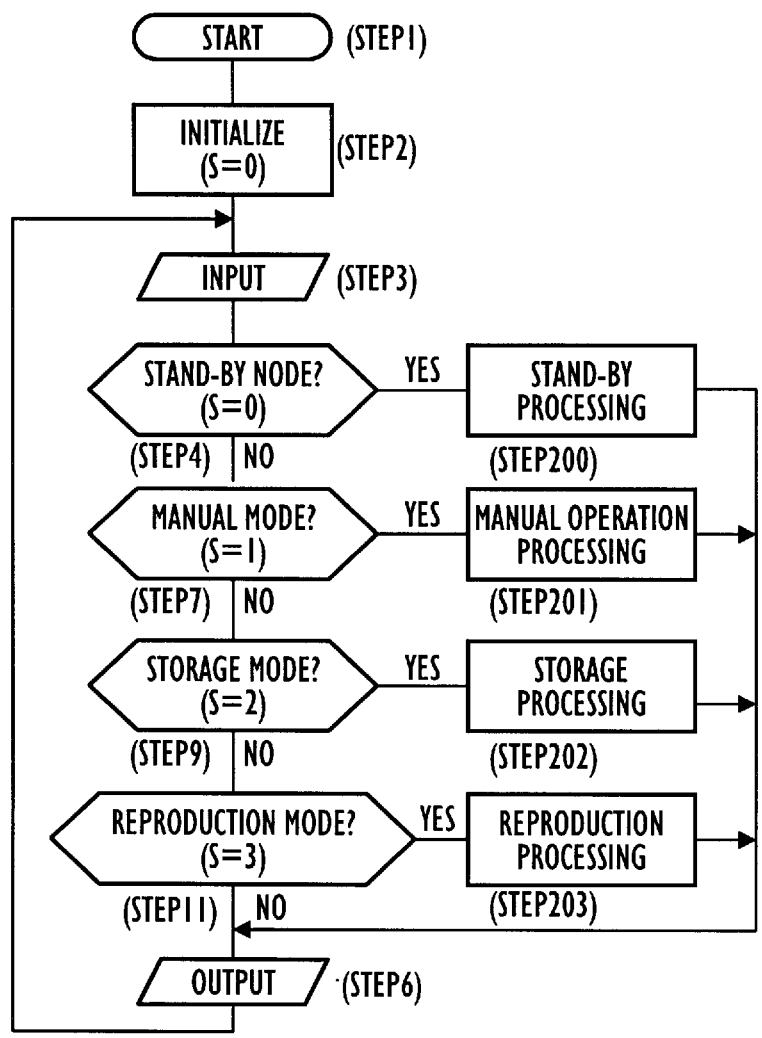
FIGS. 28 to 33 are flowcharts showing the signal processing procedures carried out in the mirror position control block.

FIG. 28 is a flowchart briefly showing the procedure of processing signals in the mirror position control block 700. In the signal processing procedure shown in FIG. 28, the same processings as those in the procedure shown in FIG. 16 or 22, described above, are denoted by the same Step numbers, and detailed description thereof is herein omitted.

In the control flow shown in FIG. 28, when the operating mode is judged to be the stand-by mode (Step 4), the manual mode (Step 7), the storage mode (Step 9) or the reproduction mode (Step 11), the corresponding one of the following processings is executed, that is, the stand-by processing (Step 200), the manual operation processing (Step 201),the storage processing (Step 202) and the reproduction processing (Step 203), which will be explained below with reference to FIGS. 29 to 32.

Figure 29:
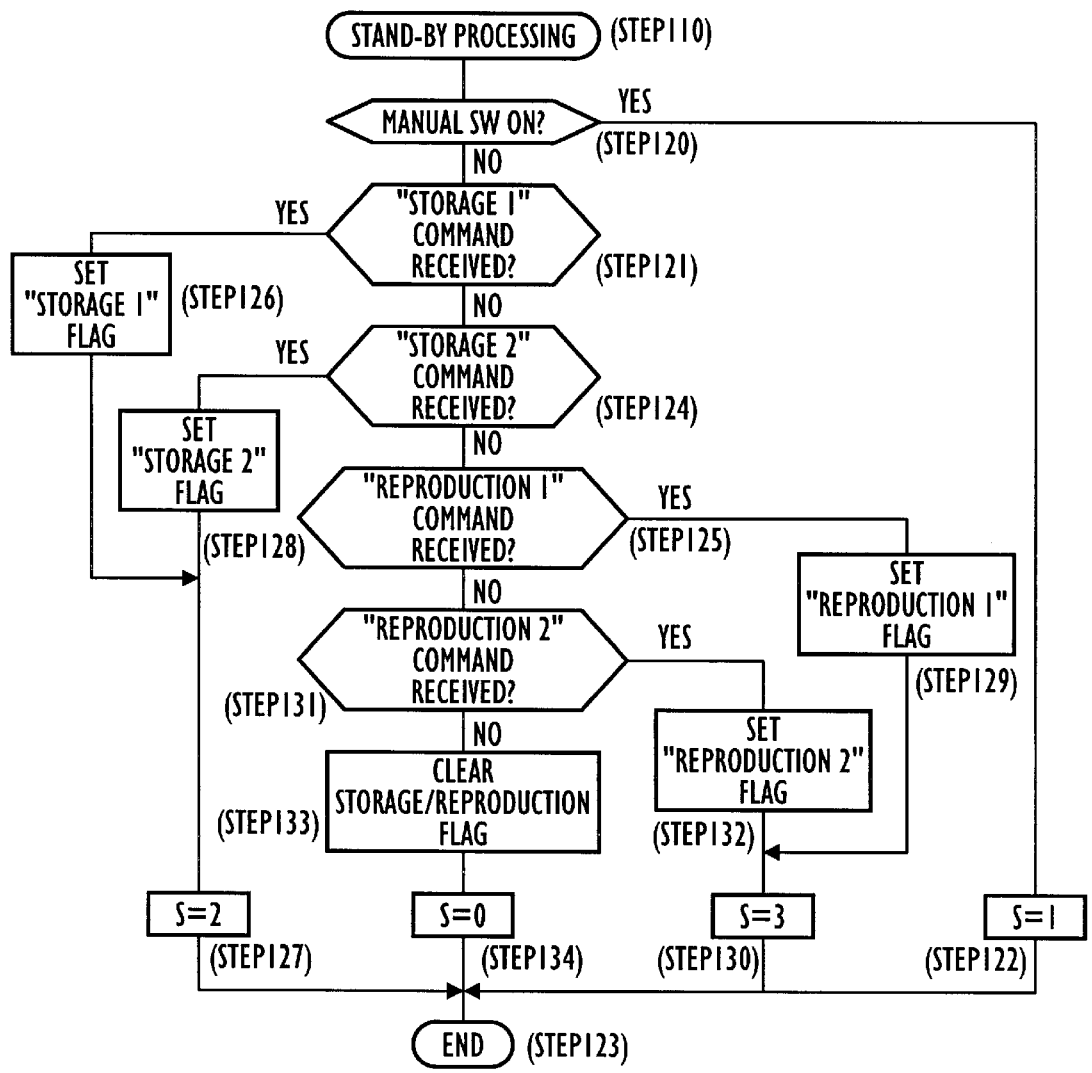

FIG. 29 shows the procedure of the stand-by processing executed in Step 200 shown in FIG. 28, which is the same as that shown in FIG. 23 and detailed description thereof is therefore herein omitted.

Figure 30:
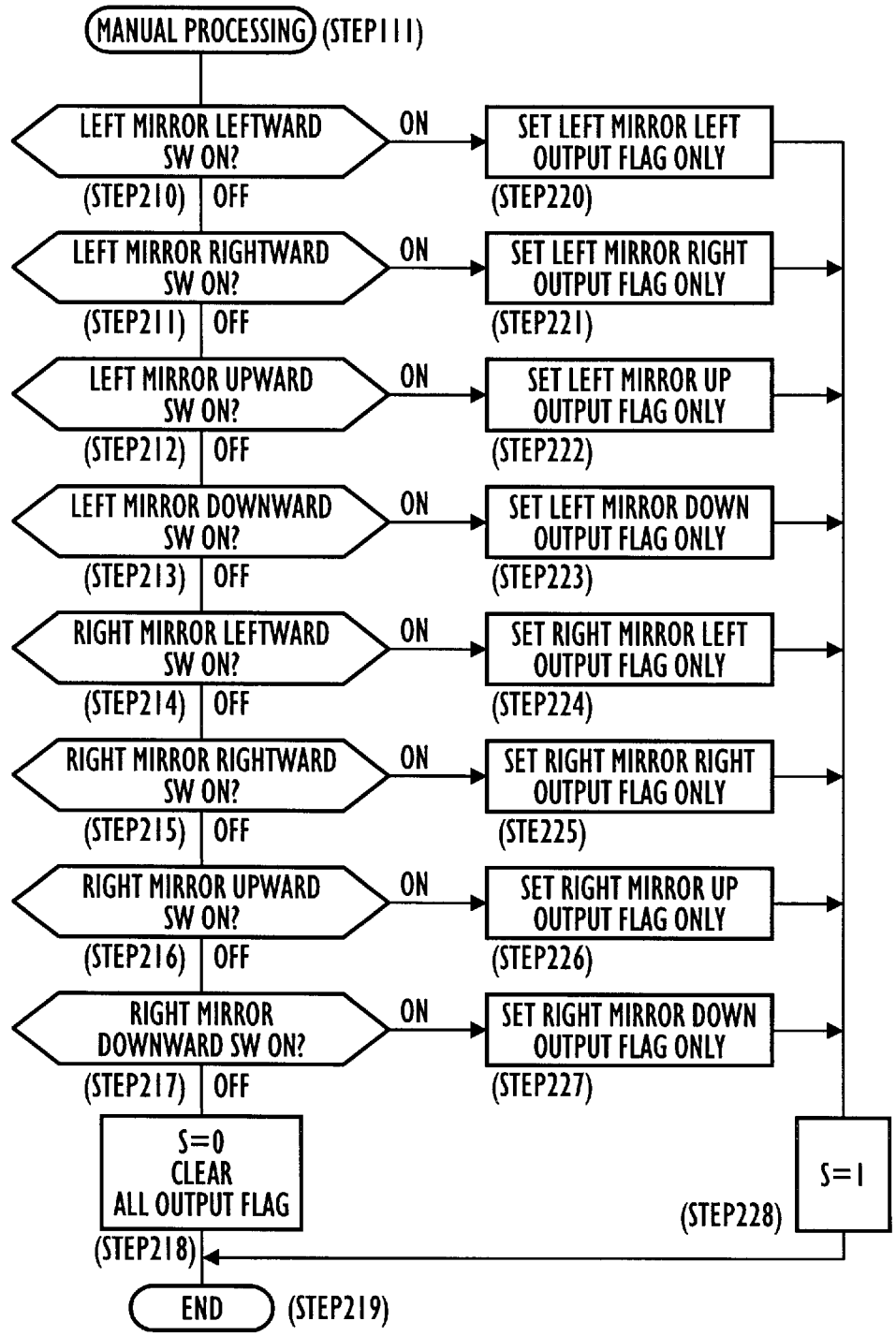

FIG. 30 shows the manual operation processing executed in Step 201 shown in FIG. 28, which is basically similar to the manual operation processing shown in FIG. 24. Accordingly, only the portions which are different from those of the flowchart shown in FIG. 24 will be explained.

Referring to FIG. 30, Steps 210 to 217 are executed to judge whether the following switches are ON or OFF, that is, the left mirror "leftward" SW (Step 210), the left mirror "rightward" SW (Step 211), the left mirror "upward" SW (Step 212), the left mirror "downward" SW (Step 213), the right mirror "leftward" SW (Step 214), the right mirror "rightward" SW (Step 215), the right mirror "upward" SW (Step 216) and the right mirror "downward" SW (Step 217).

When these switches are judged to be OFF (Steps 210 to 217), the output flags are cleared, that is, the mode switch is set to S=0 (Step 218), and the manual operation processing is completed (Step 219).

When the switches are judged to be ON in the above-mentioned Steps, Steps 220 to 227 are executed to set the corresponding flags, respectively.

More specifically, in Step 220 the left mirror "left" output flag alone is set; in Step 221 the left mirror "right" output flag alone is set; in Step 222 the left mirror "up" output flag alone is set; in Step 223 the left mirror "down" output flag alone is set; in Step 224 the right mirror "left" output flag alone is set; in Step 225 the right mirror "right" output flag alone is set; in Step 226 the right mirror "up" output flag alone is set; and in Step 227 the right mirror "down" output flag alone is set. After any of these Steps is executed, the mode switch is switched over to S=1 (Step 228), and the manual operation processing is completed (Step 219).

In the above-described manual operation processing, each flag is set after the corresponding switch is selected, and the mode switch is switched over to S=1, and it is therefore possible to increase the processing speed.

Figure 31:
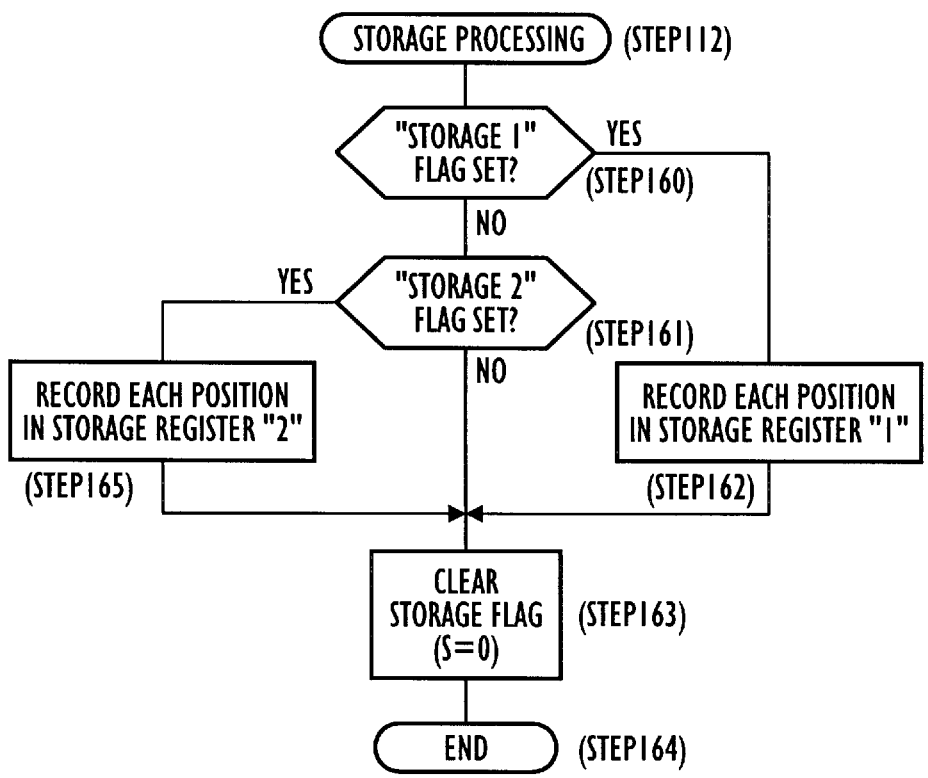

FIG. 31 shows the procedure of the storage processing executed in Step 202 shown in FIG. 28, which is the same as that shown in FIG. 25 and detailed description thereof is therefore herein omitted.

Figure 32:
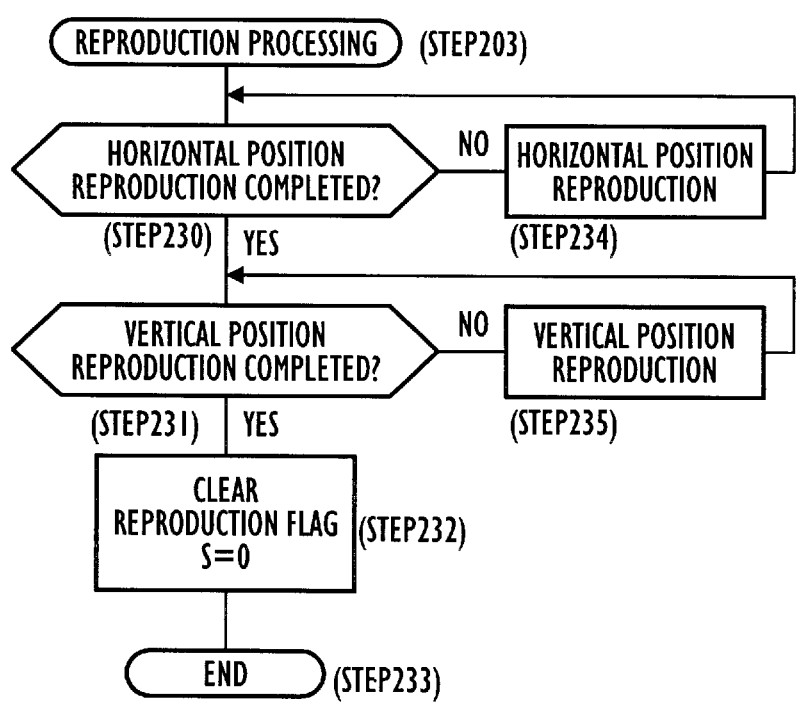

FIG. 32 is a flowchart showing a specific procedure of the reproduction processing executed in Step 203 shown in FIG. 28.

First, it is judged whether or not the reproduction of the positions of the left and right mirrors in the horizontal direction has been completed (Step 230).

If YES is the answer in Step 230, it is then judged whether or not the reproduction of the positions of the left and right mirrors in the vertical direction has been completed (Step 231).

If YES is the answer in Step 231, the mode switch is set to S=0, that is, the reproduction flag is cleared (Step 232), and the reproduction processing is completed (Step 233).

If NO is the answer in Step 230, reproduction of the positions of the left and right mirrors in the horizontal direction is executed (Step 234), and it is then judged whether or not this reproducing operation has been completed (Step 230).

If NO is the answer in Step 231, reproduction of the positions of the left and right mirrors in the vertical direction is executed (Step 235), and it is then judged whether or not this reproducing operation has been completed (Step 231).

Figure 33:
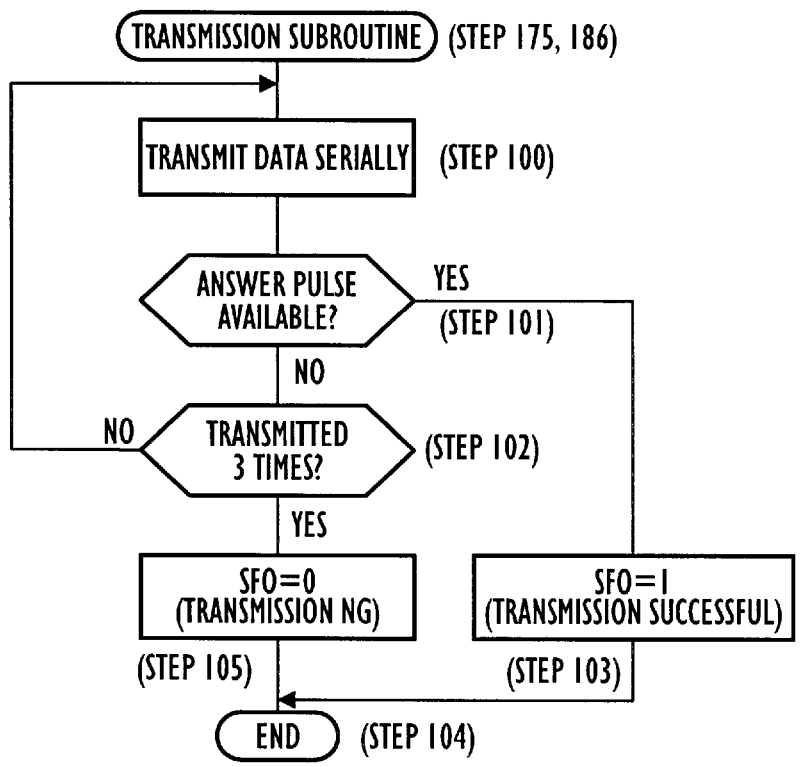

FIG. 33 shows the procedure of the transmission subroutine executed in Steps 175 and 186 shown in FIG. 28, which is the same as that shown in FIG. 27 and detailed description thereof is therefore herein omitted.

Thus, it is possible according to the foregoing embodiment to store and reproduce the seat position, steering wheel position, seat belt position and mirror angle positions as desired and also possible to activate the seat, steering and mirror position control blocks in connection with each other.

In this embodiment, when normal communication is effected between these control blocks, a 1-pulse answer signal is sent from the transmitting side to the receiving side and an answer signal thereto is sent back to the transmitting side from the receiving side. Accordingly, an operation of transmitting and receiving each individual signal is completed by confirming the answer signal.

If there is an abnormality in the communication system, no answer signal is sent from the receiving side to the transmitting side. It is therefore possible to promptly detect an abnormality occurring in the communication system.

Thus, it is possible according to the present invention to control two position control blocks in connection with each other while monitoring the communication condition. In addition, it is possible to promptly detect an abnormality occurring in the communication system by transmitting a 1-pulse answer signal from the receiving side to the transmitting side through a communication line and it is therefore possible to quickly cope with the abnormality in the communication system.

In the present invention, whether or not there is an abnormality in the communication system is detected by means of a 1-pulse answer signal and it is therefore possible to shorten the time required for the position control.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. A method of controlling the positions of a plurality of position-controlled means provided on a car, comprising:

controlling the positions of said position-controlled means by a plurality of position control means on the basis of control signals transmitted from one of said position control means acting as a host position control means through a transmitting means;

sending a confirming answer pulse in a closed loop to said host position control means from each of the position control means after receiving the control signals therefrom through a returning means;

determining an abnormality in the closed loop by an abnormality recognizing means when no confirming answer pulse is returned from said returning means in response to said control signal transmitted from said host position control means;

judging a condition of each of the position controlled means; and software controlling an order of controlling the positions of the plural position controlled means based on the judged conditions of the plural position controlled means.

2. A method as set forth in claim 1, further comprising:

transmitting said control signals a maximum of three times in the absence of said confirming answer pulse prior to determining the presence of an abnormality.

3. An apparatus for controlling the positions of position-controlled means provided on a car, comprising:

a host position control means provided on the car for controlling a position of a first position-controlled means in accordance with an occupant of the car;

a plurality of second position-controlled means each connected to said host position control means for effecting position control of said plurality of second position-controlled means on the basis of host position control signals transmitted from said host position control means to each of said plurality of second position-controlled means so that each of said plurality of second position-controlled means is controlled according to the position of said first position-controlled means and the occupant of the car;

a returning means for sending a confirming answer pulse to said host position control means in a closed loop with the transmitted control signals after receiving host position control signals transmitted to the second position-controlled means;

an abnormality recognizing means for recognizing the fact that there is an abnormality in the closed loop when no confirming answer pulse signal is returned from said returning means in response to a control signal transmitted from said host position control means;

judging a condition of each of the position controlled means; and software controlling an order of controlling the positions of the plural position controlled means based on the judged conditions of the plural position controlled means.

4. An apparatus as set forth in claim 2, further comprising means for instructing transmission of said control signals a maximum of three times in the absence of detecting said confirming answer pulse.

5. An apparatus as set forth in claim 2, wherein the confirming answer pulse sent by said returning means comprises a one pulse signal.

6. An apparatus as set forth in claim 4, wherein the confirming answer pulse sent by said returning means comprises a one pulse signal.

7. A method as set forth in claim 1, wherein the sent confirming answer pulse comprises a one pulse signal.

8. A method as set forth in claim 2, wherein the sent confirming answer pulse comprises a one pulse signal.

* * * * *